US012619896B2

(12) United States Patent
Phillip et al.

(10) Patent No.: US 12,619,896 B2
(45) Date of Patent: May 5, 2026

(54) BAYESIAN OPTIMAL MODEL SYSTEM (BOMS) FOR PREDICTING EQUILIBRIUM RIPPLE GEOMETRY AND EVOLUTION

(71) Applicant: The Government of the United States of America, as represented by the Secretary of the Navy, Arlington, VA (US)

(72) Inventors: Ryan E. Phillip, Covington, LA (US); Allison M. Penko, Diamondhead, MS (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 796 days.

(21) Appl. No.: 17/851,390

(22) Filed: Jun. 28, 2022

(65) Prior Publication Data

US 2023/0017695 A1     Jan. 19, 2023

Related U.S. Application Data

(60) Provisional application No. 63/216,522, filed on Jun. 29, 2021.

(51) Int. Cl.
*G06N 7/01* (2023.01)
*G01V 20/00* (2024.01)
*G06N 20/20* (2019.01)

(52) U.S. Cl.
CPC .............. *G06N 7/01* (2023.01); *G01V 20/00* (2024.01); *G06N 20/20* (2019.01)

(58) Field of Classification Search
CPC ........ G06F 18/29; G06F 18/295; G06F 18/27; G06N 20/20
See application file for complete search history.

(56) References Cited

PUBLICATIONS

Bartz-Beielstein, Thomas. "Stacked generalization of surrogate models—a practical approach." (2016). (Year: 2016).*

(Continued)

*Primary Examiner* — Schyler S Sanks
(74) *Attorney, Agent, or Firm* — US Naval Research Laboratory; Nigel R. Fontenot

(57) ABSTRACT

A method of training a machine learning model to predict seafloor ripple geometry that includes receiving one or more input values, each input value based on an observation associated with ocean wave and seafloor conditions, and preprocessing the one or more input values. The method includes generating a training data set based on the preprocessed data set, splitting the training data set into a plurality of folds, and training via stacked generalization the machine learning model by performing a cross validation of each fold of training data based on at least one deterministic equilibrium ripple predictor model and on at least one machine learning algorithm. The method may include generating via the trained machine learning model, a set of one or more seafloor ripple geometry predictions, and performing Bayesian regression on the set of one or more seafloor ripple predictions to generate a probabilistic distribution of predicted seafloor ripple geometry.

19 Claims, 19 Drawing Sheets

Spatial Scales of Seabed Features

Example Spatial Scales of BOMS

(56) References Cited

PUBLICATIONS

Yan B, Zhang QH, Wai OW. Prediction of sand ripple geometry under waves using an artificial neural network. Computers & geosciences. Dec. 1, 2008;34(12):1655-64. (Year: 2008).*
Soulsby RL, Whitehouse RJ, Marten KV. Prediction of time-evolving sand ripples in shelf seas. Continental Shelf Research. Apr. 15, 2012;38:47-62. (Year: 2012).*
Pavlyshenko B. Using stacking approaches for machine learning models. In 2018 IEEE second international conference on data stream mining & processing (DSMP) Aug. 21, 2018 (pp. 255-258). IEEE. (Year: 2018).*

* cited by examiner

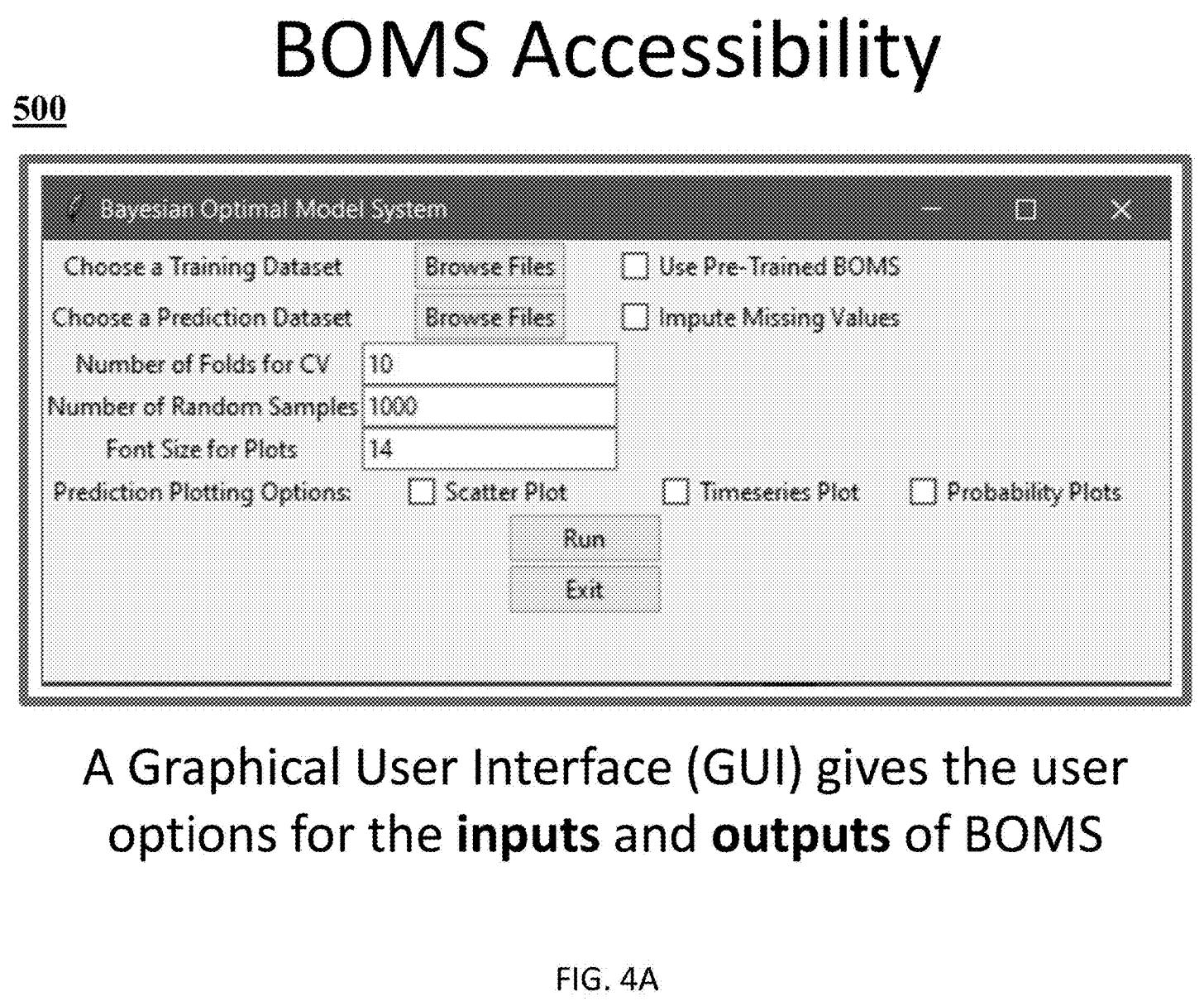

BOMS Accessibility

500

Bayesian Optimal Model System

Choose a Training Dataset    Browse Files    ☐ Use Pre-Trained BOMS

Choose a Prediction Dataset    Browse Files    ☐ Impute Missing Values

Number of Folds for CV    10

Number of Random Samples    1000

Font Size for Plots    14

Prediction Plotting Options    ☐ Scatter Plot    ☐ Timeseries Plot    ☐ Probability Plots Run Exit A Graphical User Interface (GUI) gives the user
options for the inputs and outputs of BOMS

FIG. 4A

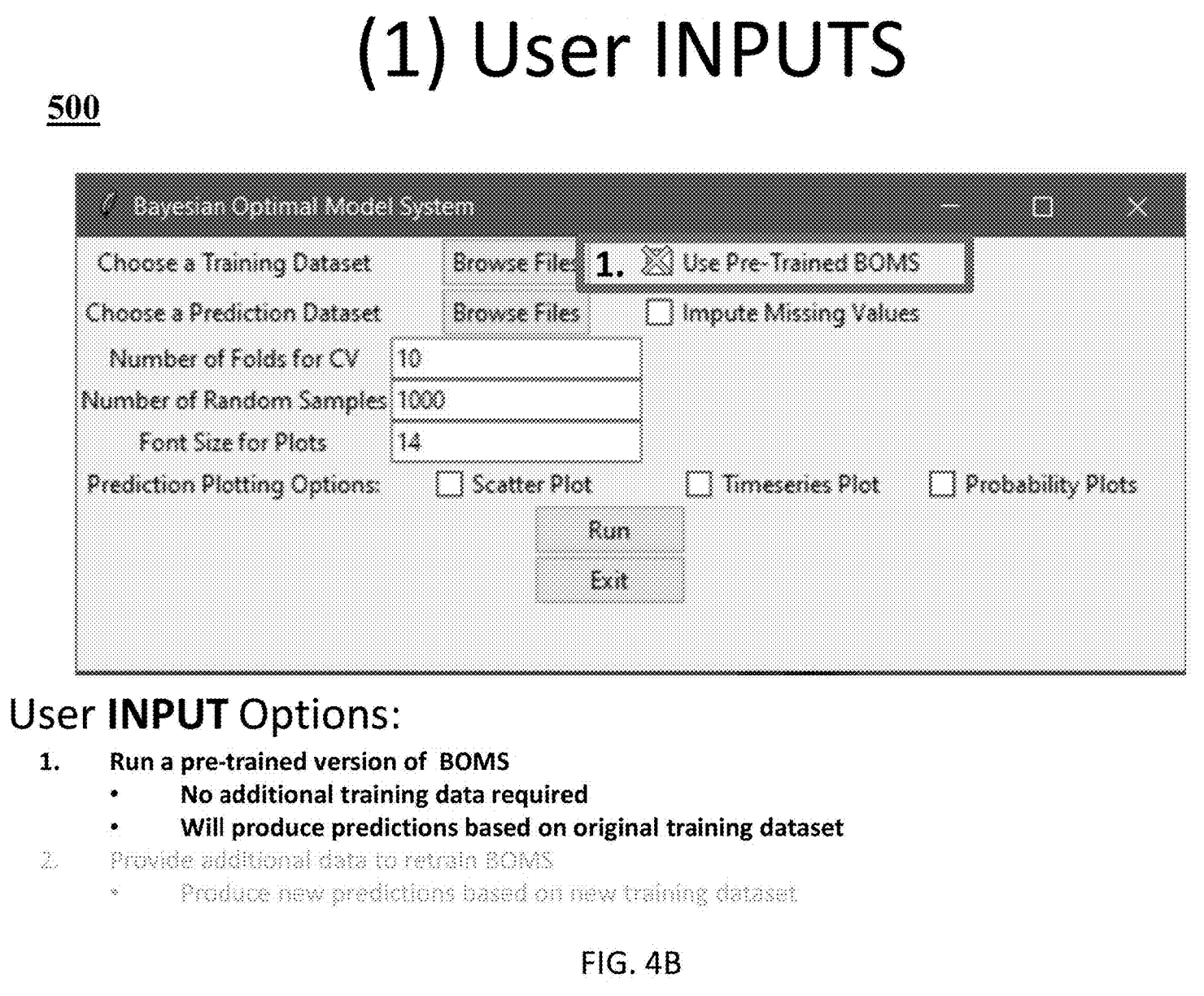

(1) User INPUTS

500

Bayesian Optimal Model System

Choose a Training Dataset          Browse File    1.  ⊠ Use Pre-Trained BOMS

Choose a Prediction Dataset        Browse Files         ☐ Impute Missing Values

Number of Folds for CV             10

Number of Random Samples:          1000

Font Size for Plots                14

Prediction Plotting Options:   ☐ Scatter Plot    ☐ Timeseries Plot    ☐ Probability Plots Run Exit

User INPUT Options:

1.  Run a pre-trained version of BOMS
    - No additional training data required
    - Will produce predictions based on original training dataset 2.  Provide additional data to retrain BOMS
    - Produce new predictions based on new training dataset

FIG. 4B

Figure 4C:
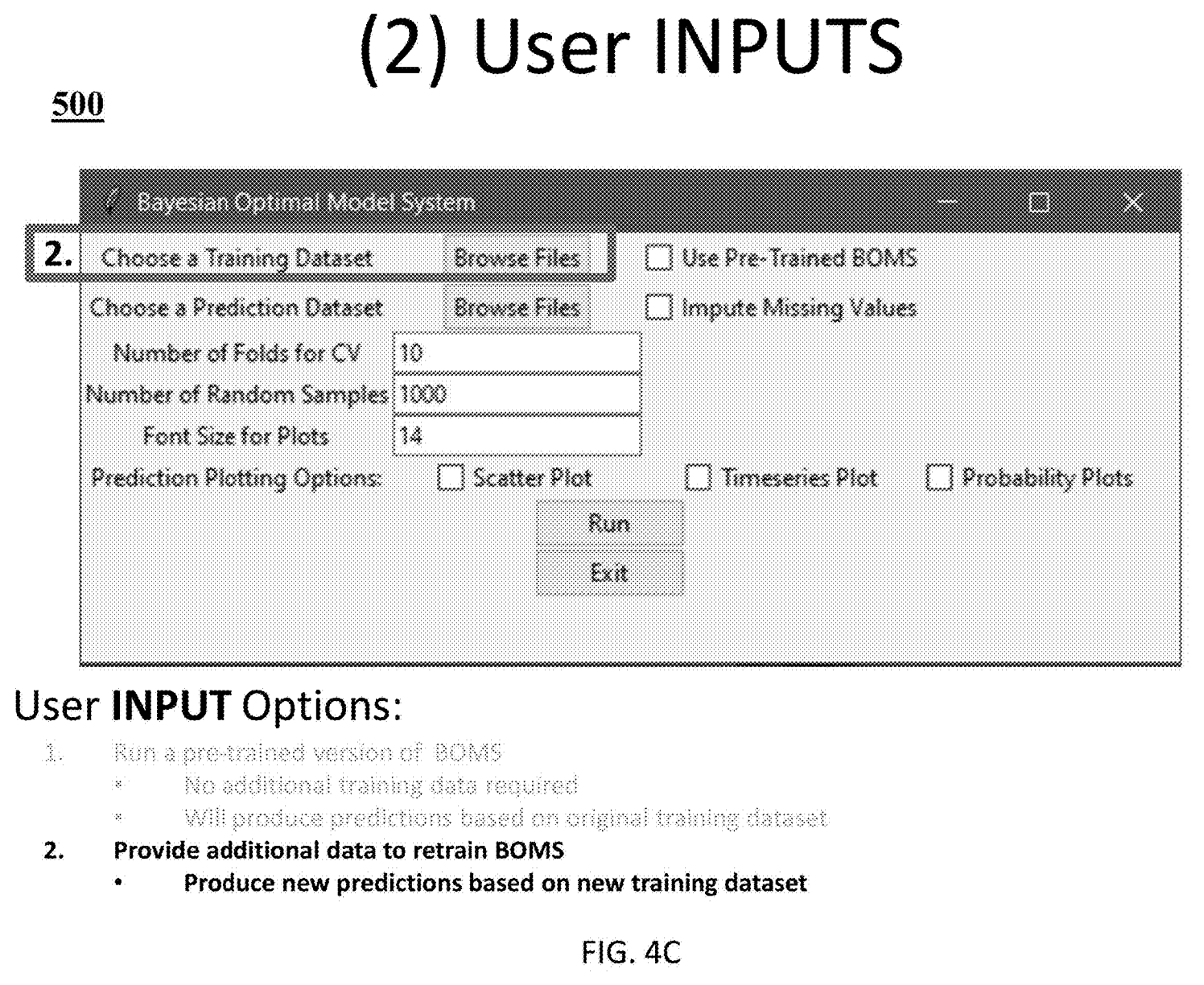

(2) User INPUTS

500

Bayesian Optimal Model System

| | |
|---|---|
| Choose a Training Dataset | Browse Files | ☐ Use Pre-Trained BOMS |
| Choose a Prediction Dataset | Browse Files | ☐ Impute Missing Values |
| Number of Folds for CV | 10 | |
| Number of Random Samples | 1000 | |
| Font Size for Plots | 14 | |
| Prediction Plotting Options: | ☐ Scatter Plot | ☐ Timeseries Plot | ☐ Probability Plots |

Run

Exit

User INPUT Options:

1. Run a pretrained version of BOMS
   - No additional training data required
   - Will produce predictions based on original training dataset 2. Provide additional data to retrain BOMS
   - Produce new predictions based on new training dataset

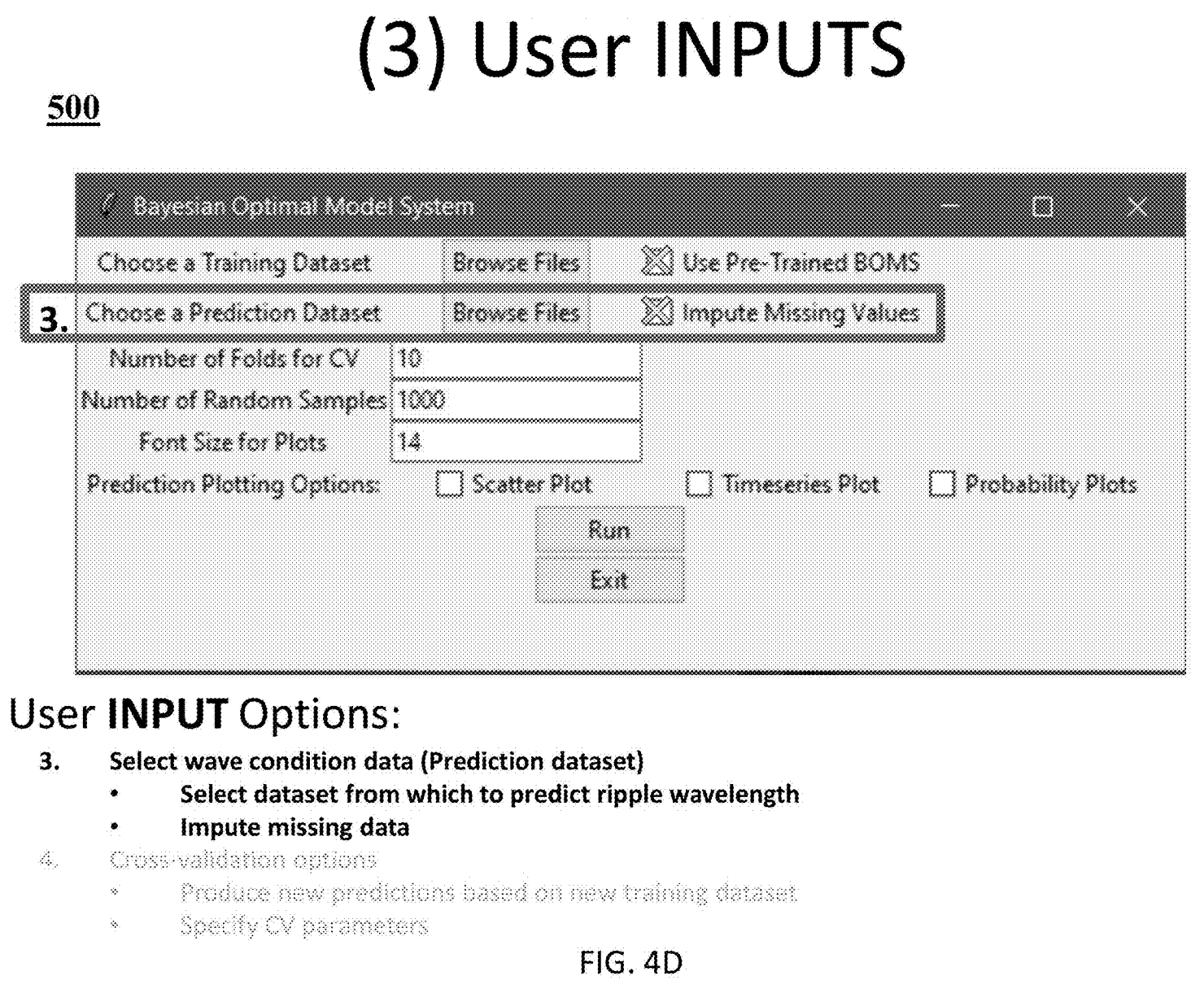

(3) User INPUTS

Bayesian Optimal Model System

| Choose a Training Dataset | Browse Files | ☒ Use Pre-Trained BOMs |
| Choose a Prediction Dataset | Browse Files | ☒ Impute Missing Values |

3.

Number of Folds for CV: 10

Number of Random Samples: 1000

Font Size for Plots: 14

Prediction Plotting Options: ☐ Scatter Plot   ☐ Timeseries Plot   ☐ Probability Plots Run Exit

User INPUT Options:

3. Select wave condition data (Prediction dataset)
   - Select dataset from which to predict ripple wavelength
   - Impute missing data
   - Cross-validation options
   - Produce new predictions based on new training dataset
   - Specify CV parameters

FIG. 4D

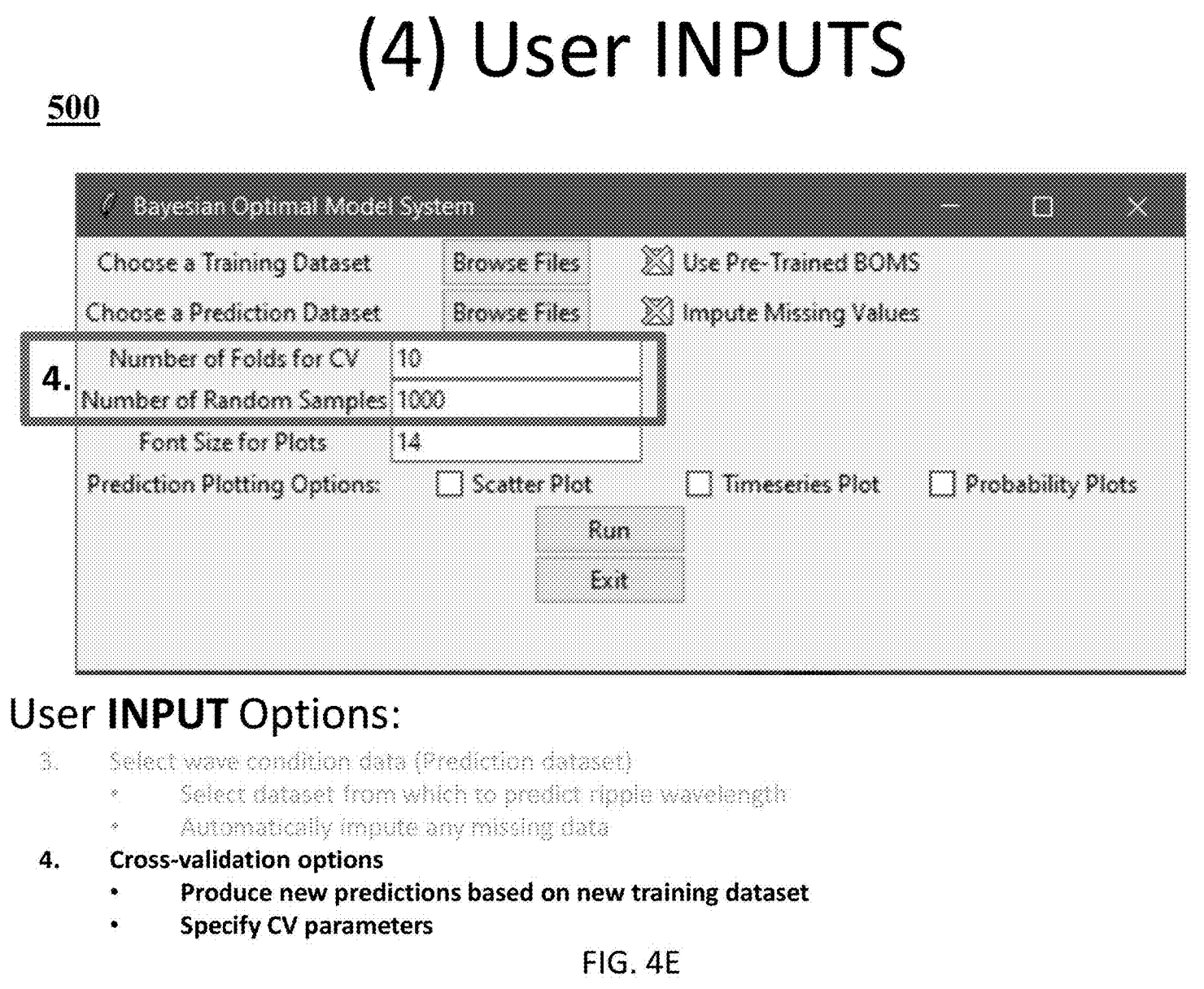

(4) User INPUTS

500

Bayesian Optimal Model System

Choose a Training Dataset    Browse Files    ⊠ Use Pre-Trained BOMs

Choose a Prediction Dataset    Browse Files    ⊠ Impute Missing Values

Number of Folds for CV    10

Number of Random Samples:    1000

Font Size for Plots    14

Prediction Plotting Options:    □ Scatter Plot    □ Timeseries Plot    □ Probability Plots Run Exit

4.

User INPUT Options:

3. Select wave condition data (Prediction dataset)
   - Select dataset from which to predict ripple wavelength
   - Automatically impute any missing data 4. Cross-validation options
   - Produce new predictions based on new training dataset
   - Specify CV parameters

FIG. 4E

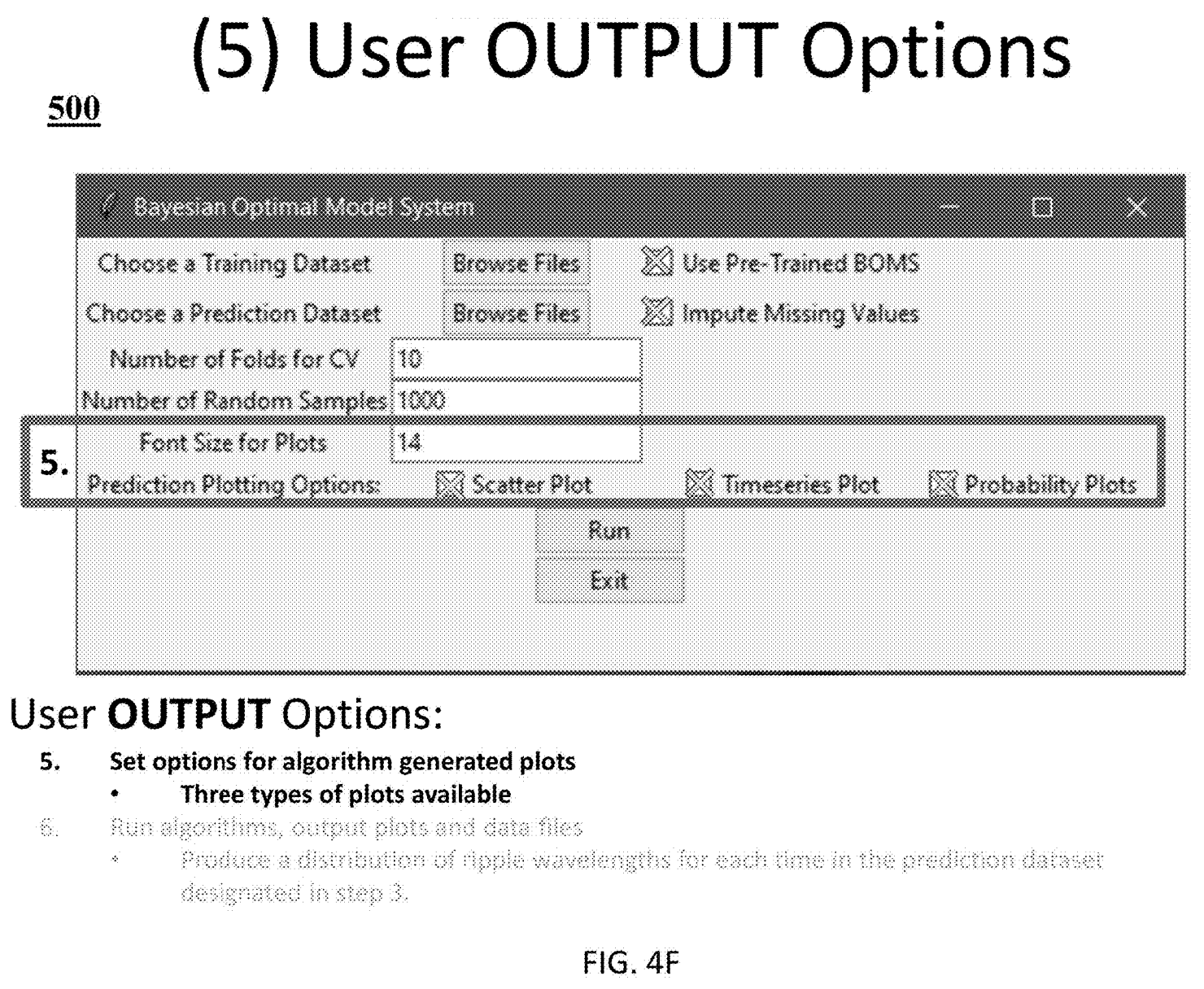

(5) User OUTPUT Options

500

Bayesian Optimal Model System

Choose a Training Dataset    Browse Files    ☒ Use Pre-Trained BOMS

Choose a Prediction Dataset    Browse Files    ☒ Impute Missing Values

Number of Folds for CV    |10|
Number of Random Samples    |1000|

Font Size for Plots    |14|

Prediction Plotting Options:    ☒ Scatter Plot    ☒ Timeseries Plot    ☒ Probability Plots 5.    Run    Exit

User OUTPUT Options:

5.    Set options for algorithm generated plots
   •    Three types of plots available 6.    Run algorithms, output plots and data files
   •    Produce a distribution of ripple wavelengths for each time in the prediction dataset
        designated in step 3.

FIG. 4F

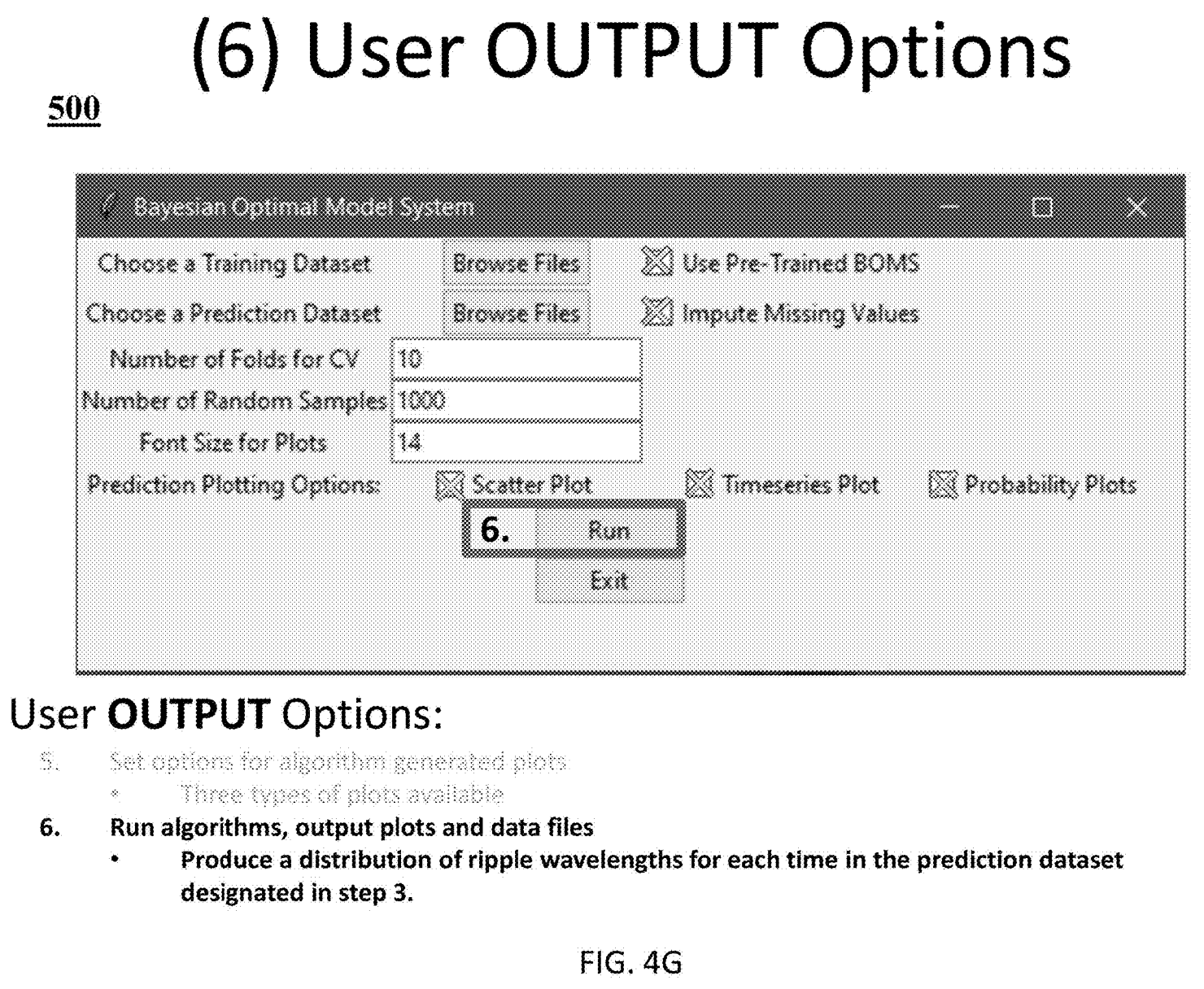

(6) User OUTPUT Options

500

Bayesian Optimal Model System

Choose a Training Dataset    Browse Files    ⊠ Use Pre-Trained BOMs

Choose a Prediction Dataset    Browse Files    ⊠ Impute Missing Values

Number of Folds for CV    10
Number of Random Samples    1000
Font Size for Plots    14

Prediction Plotting Options    ⊠ Scatter Plot    ⊠ Timeseries Plot    ⊠ Probability Plots

6.    Run
    Exit

User OUTPUT Options:

5. Set options for algorithm generated plots
   • Three types of plots available 6. Run algorithms, output plots and data files
   • Produce a distribution of ripple wavelengths for each time in the prediction dataset designated in step 3.

FIG. 4G

Reductions to practice

- Scatter plots of the observed and predicted ripple wavelengths for BOMS (10-fold cross validation of training data) and two of the deterministic ripple equations (Prior Art)

- BOMS adjusted $R^2$ is significantly higher with no bias

- The RMSE of BOMS was reduced by more than 12cm compared to the Prior Art

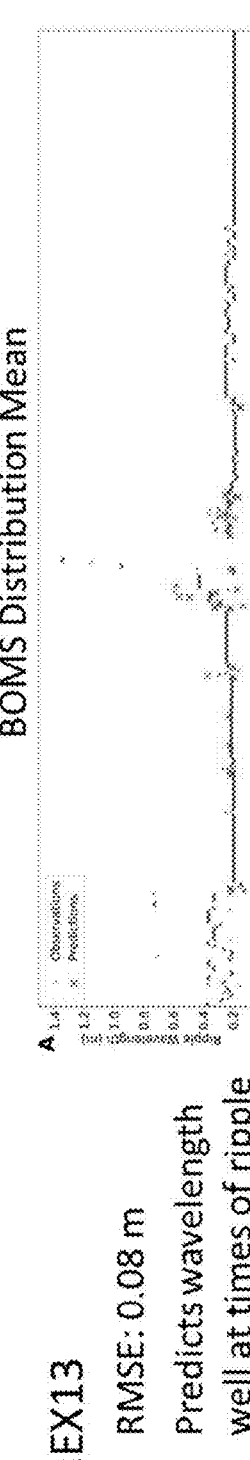
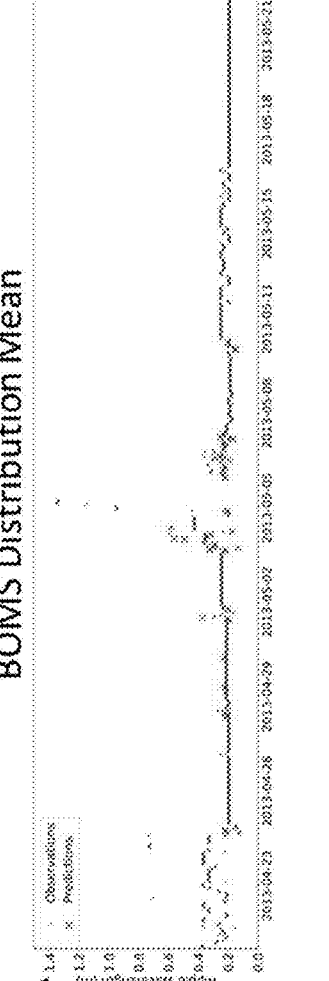
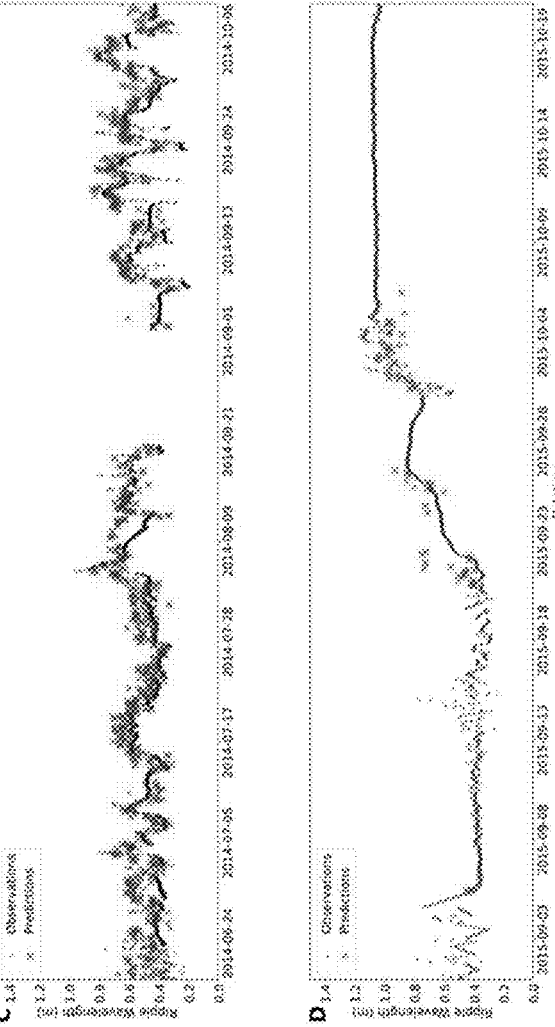
Reductions to practice
BOMS Distribution Mean
- TREX13
  - RMSE: 0.08 m
  - Predicts wavelength well at times of ripple change
- WQS14
  - RMSE: 0.12 m
  - Almost constant ripple generation and evolution
- ASIS15
  - RMSE: 0.10 m
  - Predicts when ripples change
  - Scatter in observations
FIG. 6

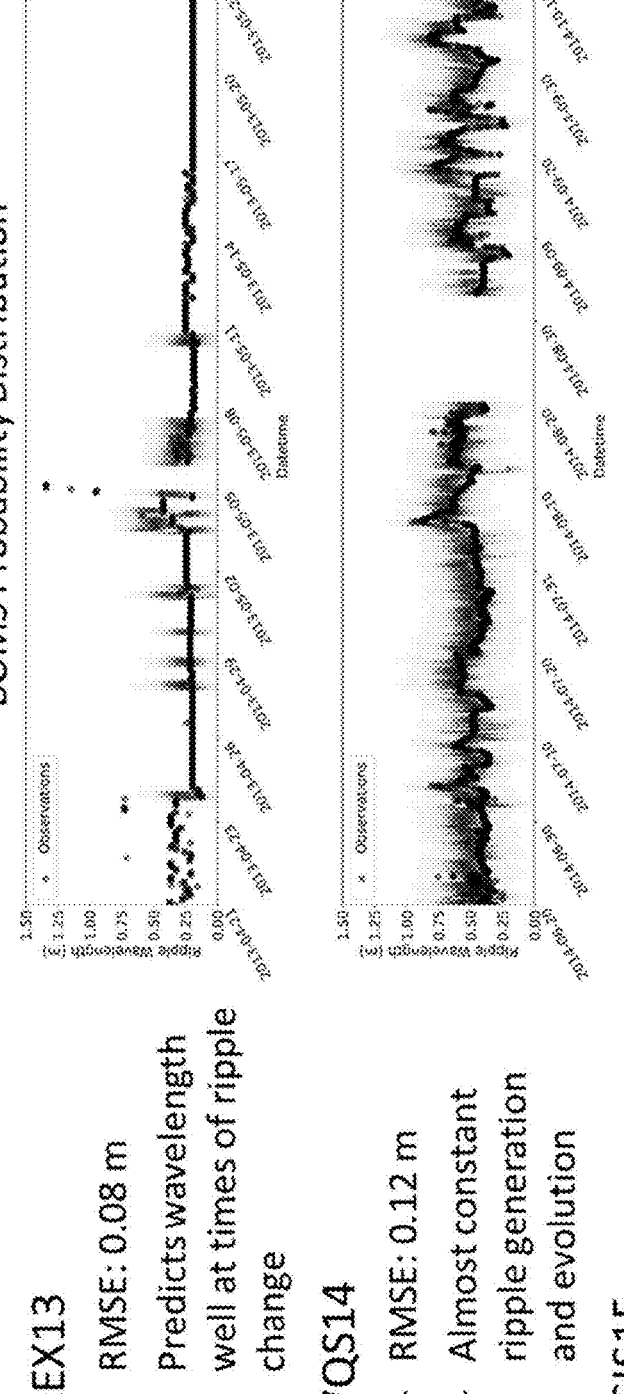
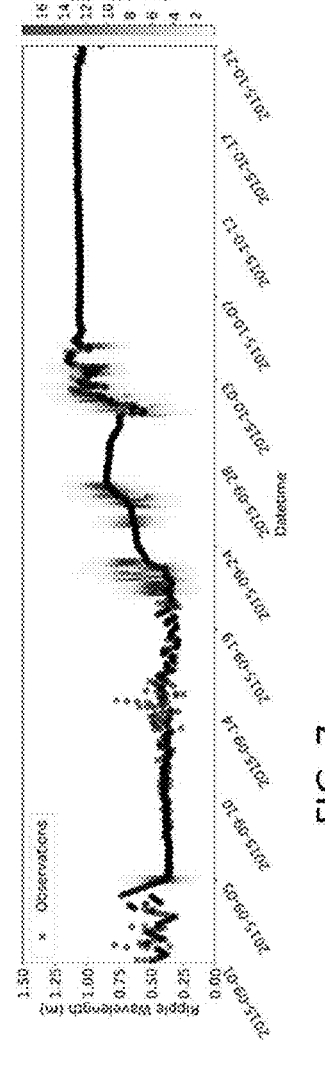
FIG. 7

Reductions to practice

Probability
distribution plots
for a specific
time and
location

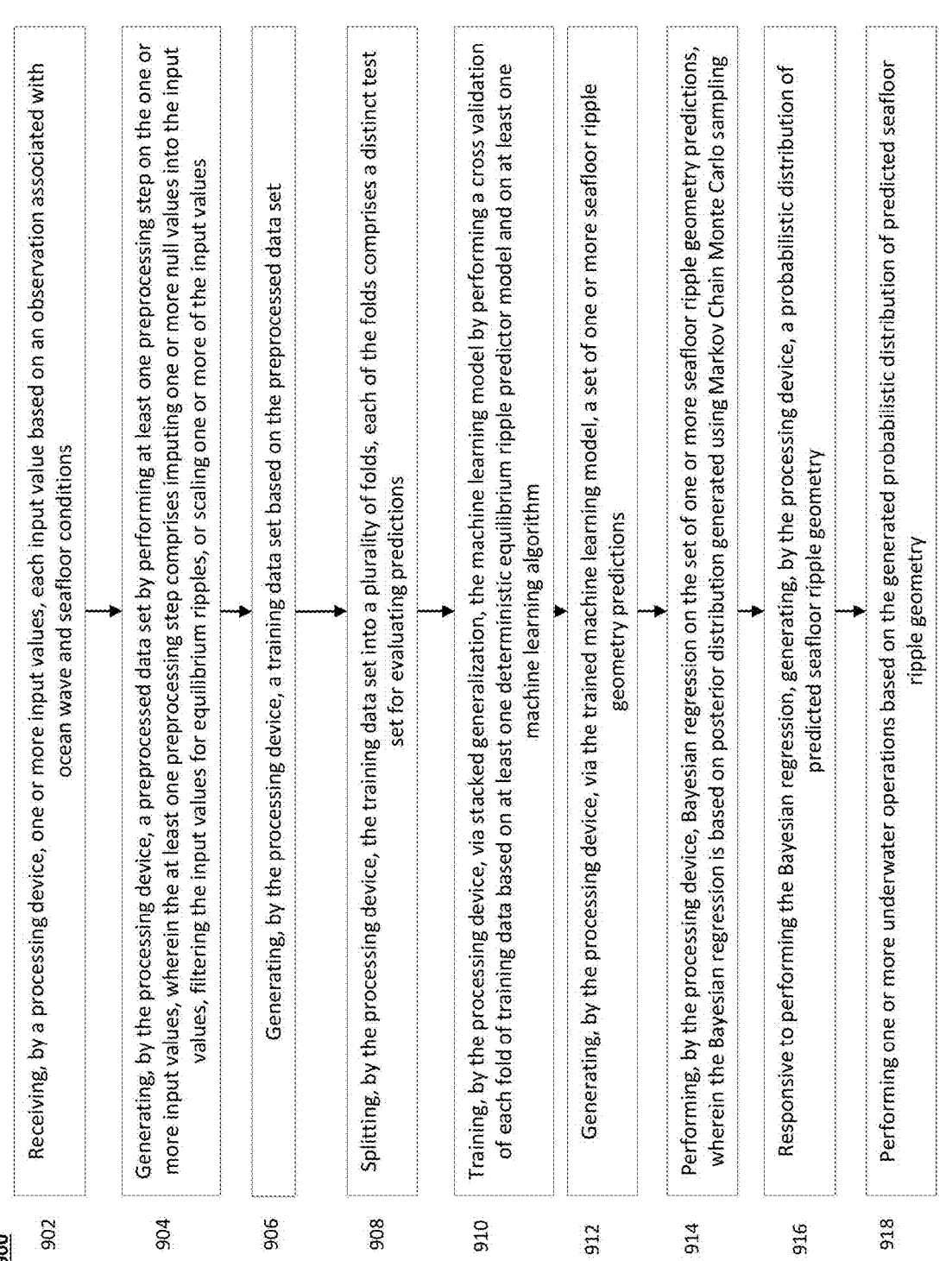

900

902    Receiving, by a processing device, one or more input values, each input value based on an observation associated with ocean wave and seafloor conditions 904    Generating, by the processing device, a preprocessed data set by performing at least one preprocessing step on the one or more input values, wherein the at least one preprocessing step comprises imputing one or more null values into the input values, filtering the input values for equilibrium ripples, or scaling one or more of the input values 906    Generating, by the processing device, a training data set based on the preprocessed data set 908    Splitting, by the processing device, the training data set into a plurality of folds, each of the folds comprises a distinct test set for evaluating predictions 910    Training, by the processing device, via stacked generalization, the machine learning model by performing a cross validation of each fold of training data based on at least one deterministic equilibrium ripple predictor model and on at least one machine learning algorithm 912    Generating, by the processing device, via the trained machine learning model, a set of one or more seafloor ripple geometry predictions 914    Performing, by the processing device, Bayesian regression on the set of one or more seafloor ripple geometry predictions, wherein the Bayesian regression is based on posterior distribution generated using Markov Chain Monte Carlo sampling 916    Responsive to performing the Bayesian regression, generating, by the processing device, a probabilistic distribution of predicted seafloor ripple geometry 918    Performing one or more underwater operations based on the generated probabilistic distribution of predicted seafloor ripple geometry

FIG. 9

$$\Lambda_t = \frac{H_t^2}{4h\,D_{50}}$$

Ripple reset number

Wave height

Grain size

Depth

BAYESIAN OPTIMAL MODEL SYSTEM (BOMS) FOR PREDICTING EQUILIBRIUM RIPPLE GEOMETRY AND EVOLUTION

CROSS-REFERENCE

This Application is a nonprovisional application of and claims the benefit of priority under 35 U.S.C. § 119 based on U.S. Provisional Patent Application No. 63/216,522 filed on Jun. 29, 2021. The Provisional Application and all references cited herein is hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing Navy Case #109643.

TECHNICAL FIELD

The present disclosure is related to predicting seafloor ripple wavelengths, and more specifically to, but not limited to, use of environmental and machine learning algorithms that provide probabilistic predictions of seafloor ripple wavelengths at a specific location given surface wave conditions.

BACKGROUND

Existing ripple geometry prediction equations, which resulted from decades of field and laboratory research on seafloor ripples, have traditionally been developed using least squares fits to equilibrium ripple observations (see e.g., Pedocchi and Garcia (2009), Soulsby and Whitehouse (2005), Grasmeijer and Kleinhans (2004), Faraci and Foti (2002), Styles and Glenn (2002), Wiberg and Harris (1994), Mogridge et al. (1994), Van Rijn et al. (1993), Grant and Madsen (1982), Nielsen (1981), and others). While the prediction equation skill has increased as new data has been collected, the method of fitting a deterministic equation to ripple geometry observations has generally stayed the same.

Improvements to these models has been made with new data and, for example, the implementation of time dependency (Traykovski, 2007); however, significant uncertainty remains in the deterministic estimations. Some more recent models has been built using various machine learning techniques such as artificial neural networks (ANNs) (Yan et al., 2008) and genetic programming (Goldstein et al., 2013). However, these models, do not undergo preprocessing techniques, have a limited training set, and/or do not perform cross validation.

Because none of the aforementioned models provide probabilistic predictions, there exists a need for a solution for a robust system that produces probabilistic seafloor ripple wavelength predictions.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

Disclosed aspects provide novel systems and methods that utilizes the ensemble machine learning method of stacked generalization may be used to develop the Bayesian Optimal Model System (BOMS). Disclosed aspects provide for a robust system that produces probabilistic seafloor ripple wavelength predictions by combining the predictive capabilities of multiple algorithms.

The present disclosure provides for a method of training a machine learning model to predict seafloor ripple geometry. The method may include receiving, by a processing device, one or more input values, each input value based on an observation associated with ocean wave and seafloor conditions, and generating, by the processing device, a preprocessed data set by performing at least one preprocessing step on the one or more input values, wherein the at least one preprocessing step comprises imputing one or more null values into the input values, filtering the input values for equilibrium ripples, or scaling one or more of the input values. The method may include generating, by the processing device, a training data set based on the preprocessed data set, splitting, by the processing device, the training data set into a plurality of folds, each of the folds comprises a distinct test set for evaluating predictions, and training, by the processing device, via stacked generalization, the machine learning model by performing a cross validation of each fold of training data based on at least one deterministic equilibrium ripple predictor model and on at least one machine learning algorithm. The method may include generating, by the processing device, via the trained machine learning model, a set of one or more seafloor ripple geometry predictions, and performing, by the processing device, Bayesian regression on the set of one or more seafloor ripple geometry predictions, wherein the Bayesian regression is based on posterior distribution generated using Markov Chain Monte Carlo sampling. The method may include responsive to performing the Bayesian regression, generating, by the processing device, a probabilistic distribution of predicted seafloor ripple geometry, and performing one or more underwater operations based on the generated probabilistic distribution of predicted seafloor ripple geometry.

BRIEF DESCRIPTION OF THE DRAWINGS

FIGS. 4A-4H illustrate example schematics of a graphical user interface window, in accordance with disclosed aspects.

FIG. 6 illustrates an example reduction to practice of BOMS, in accordance with disclosed aspects.

FIG. 7 illustrates an example reduction to practice of BOMS, in accordance with disclosed aspects.

FIG. 9 illustrates an example method, in accordance disclosed aspects.

DETAILED DESCRIPTION

The aspects and features of the present aspects summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

Disclosed embodiments provide for a robust system that produces probabilistic seafloor ripple wavelength predictions by combining and applying the predictive capabilities of multiple algorithms in one or more novel manners. Seafloor ripples affect bottom boundary layer hydrodynamics, sediment transport, and sediment resuspension. Seafloor ripples also affect bottom roughness and may be therefore important for naval applications such as acoustic sonar performance and the detection of buried objects. Additionally, aspects described herein provide for the prediction of seafloor roughness and sediment resuspension due to waves and currents, which can be used for coastal hydrodynamic and morphological forecasting.

One or more aspects described herein provide for a Bayesian Optimal Model System (BOMS), which may model uncertainties and provide probabilistic output versus deterministic (e.g., one value) predictions. A graphical user interface (GUI) may allow a user to facilitate BOMS to perform data pre-processing, produce seafloor ripple wavelength predictions with a pre-trained version of BOMS, and/or re-optimize BOMS with additional data.

The Bayesian Optimal Model System (BOMS), described herein, may use the ensemble machine learning technique of stacked generalization (Wolpert, 1992), which allows for the assembly of numerous models into one system. Disclosed embodiments may be divided into two or more layers: the base model layer(s) and the meta-learner. Predictions from one or more of the base model layer algorithms may be used as the input to a meta-learner component module, which in BOMS may be a Bayesian regression algorithm. The meta-learner may combine the predictions from the base models by deducing the biases of those models to produce a final, optimal prediction. In some embodiments, BOMS can be implemented (e.g., coded) via at least one computer programing language, such as Python (e.g., Python 3.7, etc.) or the like, and/or may utilize one or more machine learning algorithms, such as from the scikit-learn library or the like.

Figure 1:
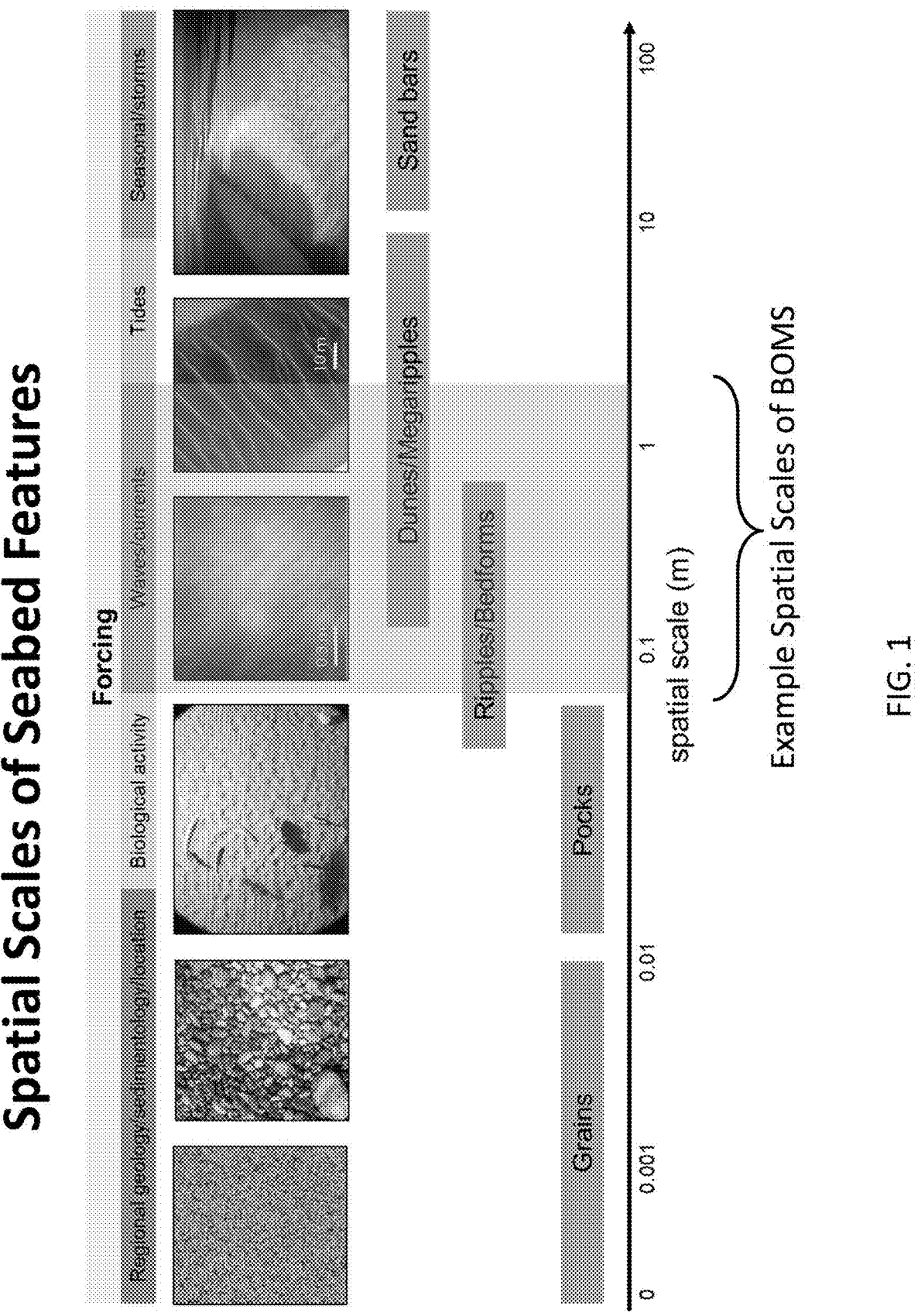
FIG. 1 illustrates range of applicable spatial scales of seabed features predictable by the Bayesian Optimal Model System (BOMS), in accordance with disclosed aspects.

FIG. 1 illustrates the spatial scales of seabed features in accordance with disclosed aspects. The following features may be listed from a smaller spatial scale to larger: Grains, Pocks, Ripples/Bedforms, Dunes/Megaripples, and Sand Bars. These features respectively correspond to the following forcing: regional geology/sedimentology/location, biological activity, waves/currents, tides, and seasonal/storms. The range of applicable spatial scales of the disclosed embodiments may include 0 to about 1000 centimeters.

Ripples may form when hydrodynamic forcing exceeds the critical threshold for sediment motion but not that for sheet flow. Equilibrium ripples refer to conditions when ripples may be in equilibrium with the hydrodynamic forcing. Ripples can influence bottom boundary layer hydrodynamics, acoustic scattering/penetration, and sediment transport/resuspension. Ripples can enhance penetration of acoustic waves in the seabed which improves detection of buried objects. Ripples however can create a backscattering surface that can complicate seabed classification when using acoustic devices.

Previously, equilibrium ripple geometry equations may be developed using a least squares fit to equilibrium ripple observations (Examples include: Nielsen, 1981; Soulsby & Whitehouse, 2005; and Nelson et al., 2013). Previously developed empirical models, however, tend to struggle with the complex, nonlinear relationships between environmental conditions that compose seabed ripples and only provide deterministic predictions. The present disclosure provides a new equilibrium ripple predictor using a machine learning approach that includes the probability distribution of equilibrium wavelengths to provide a prediction uncertainty.

Figure 2:
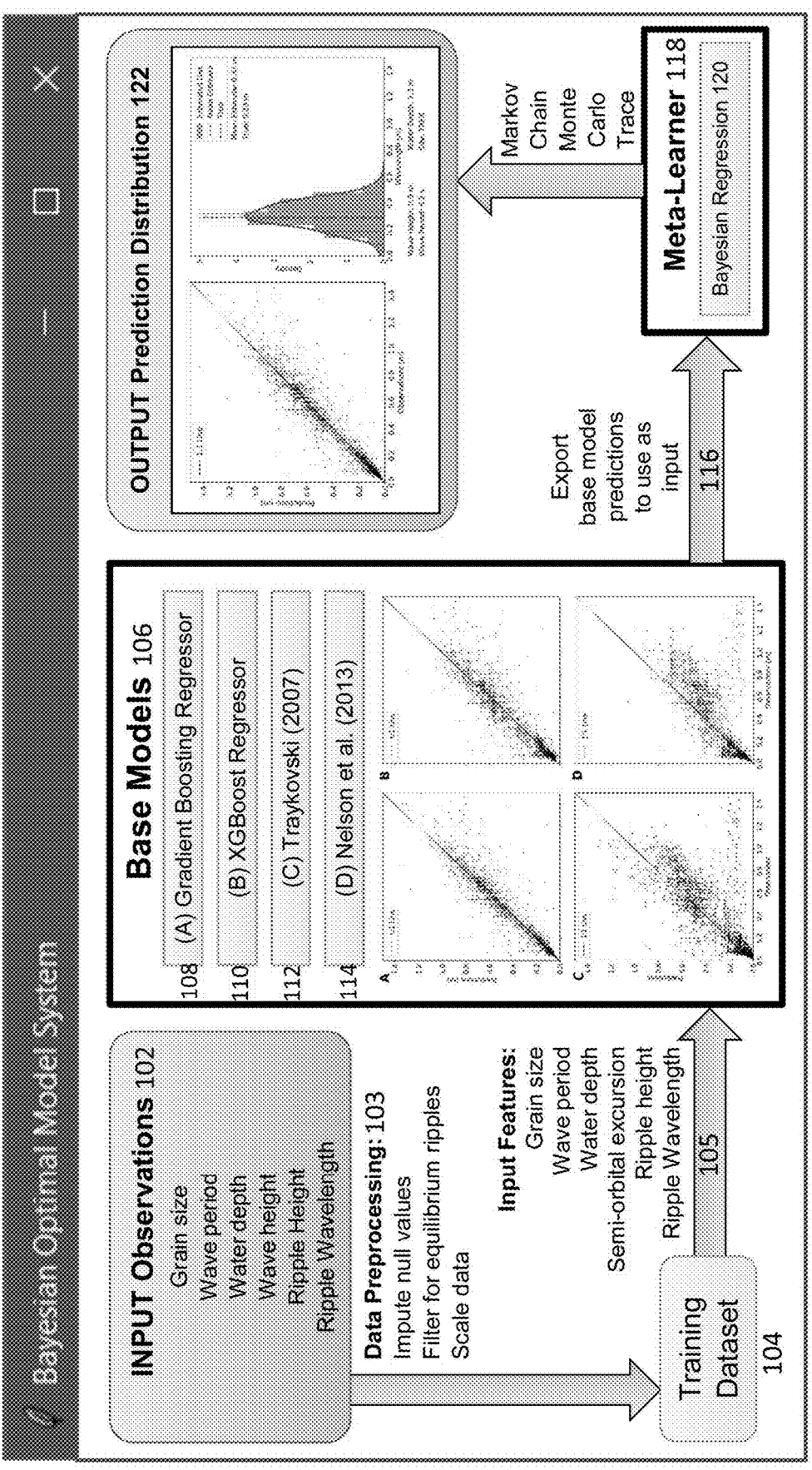
FIG. 2 illustrates a schematic flow diagram of the training process of BOMS, in accordance with disclosed aspects.

FIG. 2 illustrates a schematic flow diagram of an example Bayesian Optimal Model System (BOMS) 100 and training process in accordance with disclosed aspects. The training process may begin by inputting, importing, or receiving raw observations 102 that may include median grain size, water depth, wave period, wave height, wave semi-orbital excursion, wave orbital velocity, ripple height, ripple wavelength, and/or the like. For example, the Bayesian Optimal Model System 100 can be trained with the 50+ year dataset compiled by Nelson et al. (2013). BOMS 100 may be trained (104) with the preprocessed Nelson et al. (2013) dataset consisting of 3508 observations and other variables, called input features. In some embodiments, the dataset may be composed of observations from both field and laboratory studies including: controlled laboratory simulations, diver observations, underwater camera observations, and field observations from stationary sector scanning sonar and velocimeters. An example portion of a dataset and associated values (from Nelson et al., 2013) may be shown below:

| Source | Setup | Wave Condition[b] | $s = \rho_s/\rho_w$ | T (s) | $u_{b,\,1/3}$ (cm/s) | Depth (m) | λ (cm) | η (cm) |
|---|---|---|---|---|---|---|---|---|
| Inman [1957] | Field | IRG | 2.65 | 0.5-16 | 10-310 | 0.03-33.5 | 4.3-125 | 0.5-22.9 |
| Yalin and Russell [1962] | Flume | REG | 1.48, 1.19, 2.7 | 1-4.3 | 9.5-50.5 | 0.7 | 2-15.2 | N/A |
| Kennedy and Flacon [1965] | Flume | REG | 1.03, 1.35, 2.67 | 1.1-7.3 | 0.6-42.1 | 0.4-5.8 | 1.7-8.6 | 0.1-1.7 |
| Carstens et al. [1969] | Tunnel | REG | 2.47-2.65 | 3.3-3.8 | 12.9-79.6 | 0.3 | 8.8-46.3 | 0.5-6.9 |
| Mogridge and Kamphuis [1972] | Tunnel Flume | REG | 2.65 | 1-14.1 | 1.4-68.5 | 1.2 | 3-101.7 | 0.4-18.4 |
| Dingler [1974] | Field | IRG | 2.65 | 6.9-13.9 | 19.8-127.3 | 0.5-8 | 7.2-79 | 0.1-13.5 |
| | Tunnel | REG | 2.65 | 1.7-5 | 14-68 | 1.2, 1.7 | 6.9-39 | 0.8-6.3 |
| Lofquist [1978] | Tunnel | REG | 2.65 | 1.6-16 | 17.7-77.1 | 0.3 | 3.8-72.5 | 1.6-15.5 |
| Nielsen [1979] | Flume | REG | 2.65 | 1, 1.3, 1.7, 3 | 6.3-51.3 | 0.4 | 2.5-46 | 0.4-2.7 |
| Miller and Komar [1980] | Field | IRG | 2.65 | 6-18.2 | 4-158.5 | 3.1-32.9 | 7.6-27.1 | N/A |

-continued

| Source | Setup | Wave Condition[b] | $s = \rho_s/\rho_w$ | T (s) | $u_{b, 1/3}$ (cm/s) | Depth (m) | λ (cm) | η (cm) |
|---|---|---|---|---|---|---|---|---|
| Bosman [1981] | Tunnel | REG | 2.65 | 0.5-20 | 13-78 | 0.4 | 1.7-30 | 0.4-4.5 |
| Du Toit and Van Rijn [1981] | Flume | REG | 2.65 | 3.2-5.8 | 8.8-27.7 | 0.48 | 6.5-25.3 | 1-4.4 |
| Hayakawa et al. [1983] | Tunnel | REG | 2.65 | 4, 5, 6 | 31.5-54.7 | N/A | 25.7-34.1 | 2.7-3.8 |
| Nielsen [1984] | Field | IRG | 2.65 | 5.3-14.4 | 39.1-113.6 | 0.8-1.8 | 5-150 | 0.5-20 |
| Steetzel [1984] | Tunnel | REG IRG | 2.65 | 3-7 | 20-50 | N/A | 13-31.5 | 2-4.5 |
| Sakakiyama et al. [1986] | Flume | REG | 2.65 | 3-12 | 17-197 | N/A | 14.3-148 | 1.9-11.7 |
| Nieuwjaar and Van der Kaay [1987] | Tunnel | IRG | 2.65 | 2.4, 2.5 | 21.2-47.6 | N/A | 8.5-9.3 | 1.1-1.8 |
| Ribberink and Van Rijn [1987] | Tunnel | IRG | 2.65 | 2-5 | 38.5-71.3 | N/A | 8-13.5 | 1-1.8 |
| Boyd et al. [1988] | Field | IRG | 2.65 | 3.1-11.4 | 6.4-121.6 | 9.6-12.5 | 7-24 | N/A |
| Van Rijn [1987] | Tunnel | IRG | 2.65 | 4.6-6.3 | 62.2-178.2 | N/A | 20 | 0.1-2 |
| Southard et al. [1990] | Duct | REG | 2.65 | 3.1-19.3 | 10-100 | 0.2 | 12-196 | 2.1-23.9 |
| Van Rijn [1993] | Flume | IRG | 2.65 | 2.2-2.7 | 13.7-36.1 | 0.5 | 6-20 | 0.6-2.9 |
| Ribberink and Al-Salem [1994] | Tunnel | REG | 2.65 | 2-12 | 20-150 | 0.8 | 8.4-270 | 0.3-35 |
| Van Rijn and Havinga [1995] | Basin | REG IRG | 2.65 | 2.1-2.3 | 14.4-29.9 | 0.4 | 5.9-11.1 | 0.6-1.4 |
| Li and Amos [1998] | Field | IRG | 2.65 | 8-12.8 | 1.9-28.8 | 38.7-40 | 7.7-15.4 | 0.8-2.2 |
| Grasmeijer and van Rijn [1999] | Flume | IRG | 2.65 | 2.3 | 27-52.1 | 0.3-0.6 | 3.8-8.3 | 0.5-1.3 |
| Hume et al. [1999] | Field | IRG | 2.65 | 11 | 20-75 | 25 | 40-90 | 3-13 |
| Traykovski et al. [1999] | Field | IRG | 2.65 | 5.1-14.3 | 4.6-49.2 | 11.8-13.7 | 36.7-107 | N/A |
| Doucette [2000] | Field | IRG | 2.65 | 4.7-12.2 | 17-102.8 | 0.3-1.7 | 5-70 | 0.5-11 |
| Khelifa and Ouellet [2000] | Basin | REG | 2.65 | 0.9-1.4 | 8.2-25.5 | 0.3 | 2.8-12.1 | 0.4-1.7 |
| Williams et al. [2000] | Flume | REG | 2.65 | 3.5-5 | 19-69 | 6.5 | 8-35 | 1.5-6 |
| Faraci and Foti [2001] | Flume | REG IRG | 1.2, 2.65 | 1.3-4.2 | 5.4-86 | 0.2, 0.3 | 3.7-12 | 0.4-2.1 |
| Hanes et al. [2001] | Field | IRG | 2.65 | 7.1-19.7 | 9.2-271.8 | 1.6-6.8 | 6-270 | 0.4-9.9 |
| O'Donoghue and Clubb [2001] | Tunnel | REG IRG | 2.65 | 2-15 | 18-106 | 0.6 | 6-121 | 0.9-19.4 |
| Ardhuin et al. [2002] | Field | IRG | 2.65 | 11.4-13.8 | 37-67 | 19.7-27.6 | 77-137 | N/A |
| Doucette [2002] | Field | IRG | 2.65 | 2.2-12.2 | 15.6-59.1 | 0.2-1.1 | 8-91 | 2-14 |
| Faraci and Foti [2002] | Flume | REG IRG | 2.65 | 1.3-4.2 | 12.7-35 | 0.3 | 4.4-10.7 | 0.7-2.1 |
| Sleath and Wallbridge [2002] | Tunnel | REG | 2.65 | 2.8-6.8 | 8-164 | 0.3 | 10-50 | 1.7-9 |
| Thorne et al. [2002] | Flume | IRG | 2.65 | 4-6 | 25.7-65.8 | 4.5 | 26.2-51.3 | 4-6.5 |
| Grasmeijer and Kleinhans [2004] | Field | IRG | 2.65 | 4-10.5 | 23-98.5 | 2 | 19-200 | 0.7-10 |
| Williams et al. [2004] | Flume | IRG | 2.65 | 4-6 | 13.1-102.6 | 4, 4.5 | 20-104 | 1-7 |
| Dumas et al. [2005] | Tunnel | REG | 2.65 | 7.9-11 | 20.1-165.3 | 0.7 | 6.5-723.8 | 0.4-53.2 |
| Smith and Sleath [2005] | Tray | REG | 2.65 | 0.9-3.8 | 15.6-49 | 0.4 | 3.5-30.7 | 0.3-4.1 |
| Xu [2005] | Field | IRG | 2.65 | 8.8-18.3 | 15.6-43.8 | 15 | 4.6-7.5 | N/A |
| Brown [2006] | Flume | REG IRG | 2.65 | 4, 6, 8 | 26.5-66.8 | 4.6 | 5.5-23 | 0.2-2.3 |
| Doucette and O'Donoghue [2006] | Tunnel | REG IRG | 2.65 | 2-12.5 | 29.8-146.6 | 0.5 | 8.7-82.3 | 1.3-12.8 |
| O'Donoghue et al. [2006] | Tunnel | REG IRG | 2.65 | 3.1-12.5 | 27-88 | 0.5, 0.8 | 11.4-110.7 | 1.5-13.9 |
| Traykovski [2007] | | | | | | | | |
| Martha's Vineyard Coastal Observatory 2002 | Field | IRG | 2.65 | 1-12.9 | 5.5-133.1 | 12-13.9 | 10-127 | N/A |
| Martha's Vineyard Coastal Observatory 2005 | Field | IRG | 2.65 | 6.2-11.6 | 12-80.9 | 12.3-13.7 | 39.4-127.8 | 2.9-16.6 |
| Pedocchi and Garca [2009b] | Tunnel | REG | 2.65 | 2-25 | 20-100 | 0.6 | 5-180 | 0.6-19 |
| Nelson and Voulgaris[c] | | | | | | | | |
| Long Bay, SC | Field | IRG | 2.65 | 4.8-12.7 | 6.6-43.9 | 8.2-10.6 | 7-22.4 | N/A |
| Georgia Shelf | Field | IRG | 2.65 | 6.5-12.3 | 3.1-45.6 | 26.1-29 | 9.5-75.8 | N/A |

Data may go through a preprocessing stage 103, which may include, for example, filtering, handling null values, and/or scaling. The raw observations may be filtered for samples where equilibrium ripples may be present. In some embodiments, the equilibrium ripple criteria established in Nelson et al., 2013 may be used. According to some aspects, any lab experiment with a Shields parameter greater than the critical Shields parameter for sediment motion ($\theta_{1/3} > \theta_{cr}$) may be considered equilibrium.

The scikit-learn models which may be used in the model system may remove or replace one or more null values. For the null values, particularly null ripple height values, scikit-learn's KNNImputer class may be used to impute those values. Since the k-nearest neighbors (KNN) algorithm determines the nearest neighbors based on Euclidean distance, the data may be scaled appropriately. In one example, scaling may be performed to standardize the independent features of a dataset so distributions will have a mean value of 0 and a standard deviation of one. Standardization scaling may be performed using scikit-learn's StandardScaler class. Inverse transformation may be applied to the data after imputation so the values resembled the original units of measurement.

Figure 11:
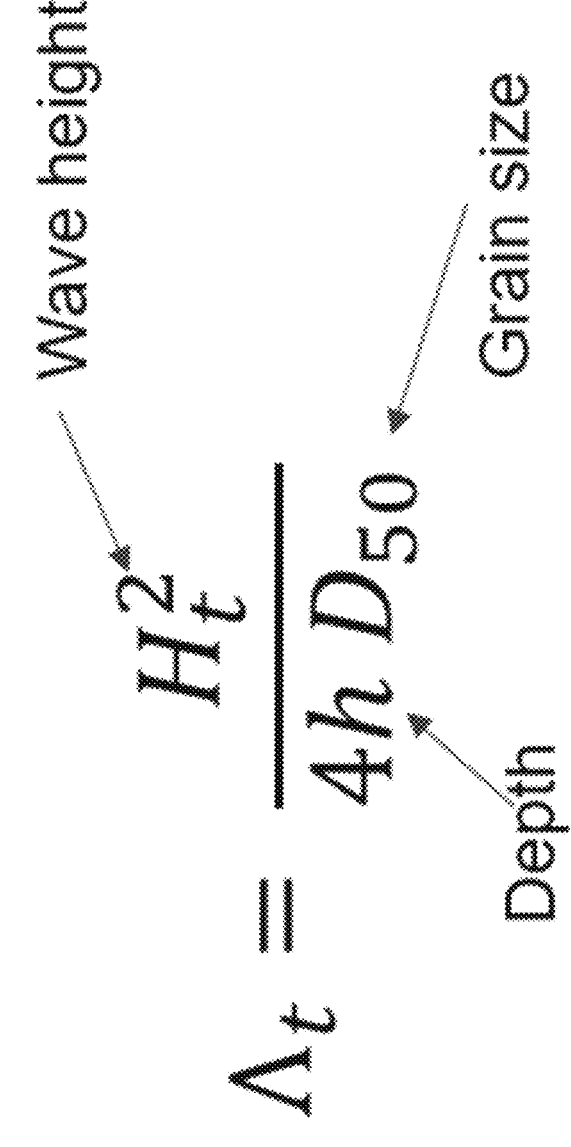
FIG. 11 illustrates a ripple reset number.

According to some aspects, a Ripple Reset model may be used to predict the probability that given wave conditions will change seafloor roughness for field observations. Ripple resets may be events when the ripple wavelength changes significantly. Wave conditions may be summarized by a ripple reset number, shown in FIG. 11.

The ripple reset number may depend on the significant wave height, depth, and sediment grain size. According to some aspects, estimates may be determined for an intensity function of the point process that may be driven by the wave conditions, from which the probability that the ripples will change over a given interval:

$$\log \gamma_t = f(\wedge_{t}, \wedge_{t-1}, \wedge_{t-2})$$    Intensity function    (5)

The ripple field may be evolving during any period where the probability or intensity may be above a certain threshold.

To determine an appropriate threshold value, an additional formula may be developed: $\bar{u}$. The following equation may be used to determine an intensity threshold where c may be the number of Spearman correlation coefficients, $p_i$ may be the Spearman correlation coefficient of the ith variable against ripple wavelength, and n may be the number of data points after filtering with a given intensity threshold:

$$\bar{u} = \frac{\sum_{i=1}^{c} (|\rho_i| \times \log_e n)}{c},$$

Figure 12:
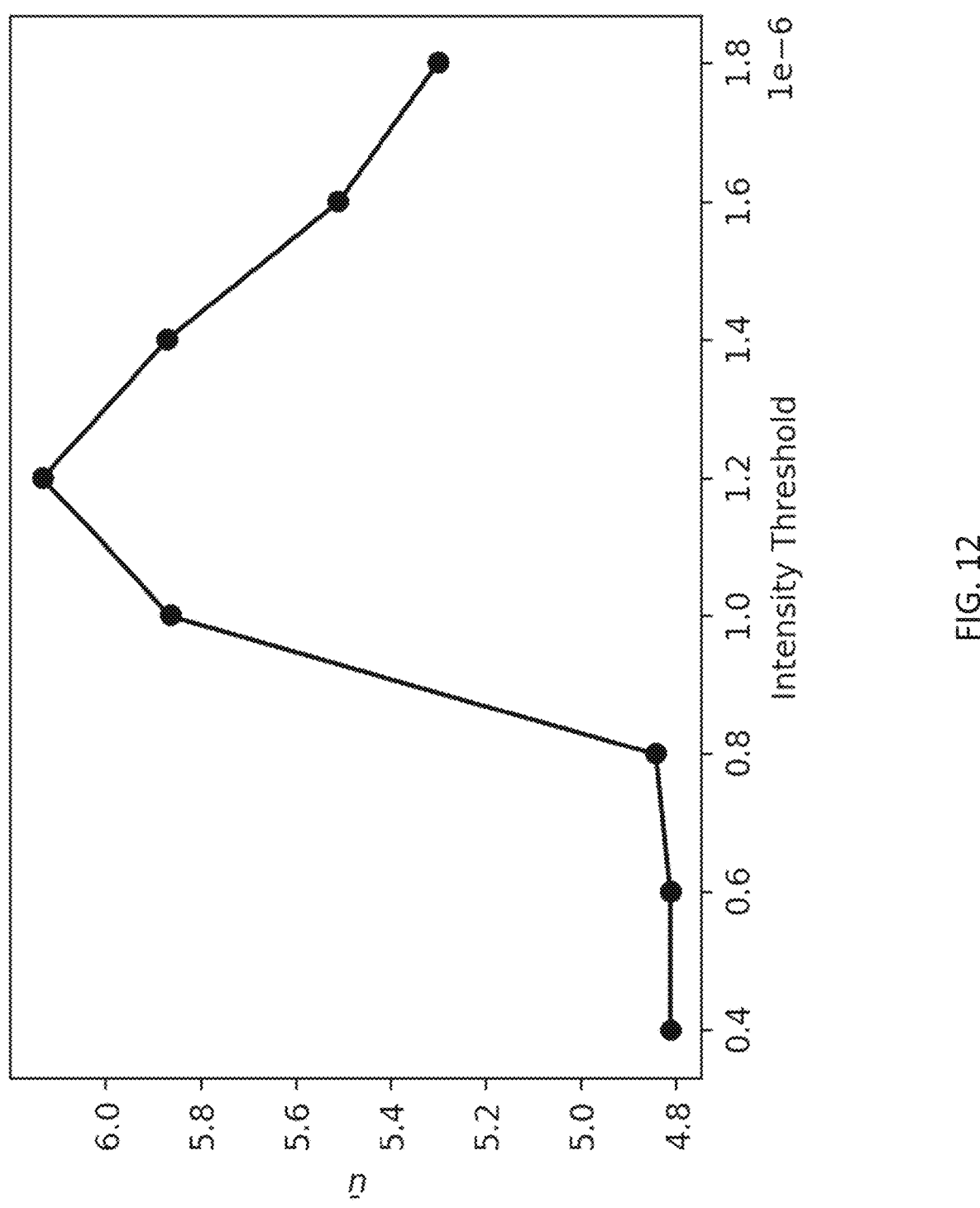
FIG. 12 is a scatter plot of u vs Intensity threshold for the Nelson et al., 2013 training dataset.

FIG. 12 is a scatter plot of u vs Intensity threshold for the Nelson et al., 2013 training dataset.

Higher $\bar{u}$ scores may be favorable over lower scores. Plotting u against Intensity threshold results in a curve with the peak corresponding to the optimal Intensity threshold. In one example, an intensity threshold of 1.2E–6 may be optimal.

Scaling and imputation may be performed within a separate Python script from model optimization and training as to avoid data leakage. Data leakage may be when information from outside the training set (e.g., information from the test set) may be seen during model training. One of the most common causes of data leakage may be improper fitting and transforming during preprocessing actions such as standardization scaling. Fitting may be the step of calculating the parameters for a model equation using the training data. Fitting may be, for example, the step of training the model. Transforming may be when the calculations performed while fitting may be applied to the data. Scaling can be especially problematic when utilizing 10-fold cross validation because if a model may be fit with an already preprocessed dataset, each of the temporary test sets will have been seen which will result in bias. Scikit-learn's Pipeline class mitigates this problem by only fitting the preprocessing methods to the training set for each fold. Each machine learning base model in BOMS 100 may be contained within a separate pipeline. These preprocessing steps can be applied to any additional observation data that may be received at 102, such as newly observed data.

BOMS 100 may run input features 105 though one or more of the base models 106. BOMS 100 may include a single base model layer made up of one or more of four algorithms. A diverse set of algorithms may be necessary to handle the complex relationships between the predictor variables and ripple wavelength. In the present example, different types of models may be chosen to diversify predictive performance: two machine learning algorithms and two deterministic empirical equilibrium ripple wavelength formulae. Different configurations and numbers may be implemented in some embodiments. According to some aspects, the number and/or type of base models for stacked generalization may be selected based on the process or technique and the individuality of the application.

BOMS 100 may include use of the deterministic equilibrium ripple predictor equations as base models in the stacked system. This approach allows for use of tested empirical relationships in the BOMS 100.

In one example, two deterministic empirical ripple models and eight machine learning base models were evaluated to determine which combination produced the highest overall prediction skill of BOMS 100. In exemplary embodiments, the testing resulted in a configuration with two machine algorithms (gradient boosting regressor 108 and XGBoost regressor 110) and the two deterministic empirical ripple equations: Traykovski (2007) 112 and Nelson et al. (2013) 114. The two empirical ripple formulas may work to expand the diversity of the base models through the implementation of non-machine learning equations (e.g., the parameters of these equations might not change during the training of the system). Other configurations, however, may be implemented, such as depending on a specific application.

The hyperparameter(s) (e.g., configuration variables external to a model set by the user) of the machine learning algorithm(s) in the base model layer of BOMS 100 may be tuned via the scikit-learn GridSearchCV function, which may efficiently determine the optimal hyperparameter value(s) for the two machine learning base models.

The machine learning algorithms used in the base model layer of BOMS 100 may have parameters and hyperparameters, each of which may influence how the model performs. A parameter may be a configuration variable internal to a model and whose value may be determined while fitting the model to training data. A hyperparameter may be a configuration variable external to a model and whose value may be set by the user. If desired by the user, hyperparameters may be tuned since the optimal value might not be determined through fitting the model to training data. A grid search, constructed using scikit-learn's GridSearchCV function, may be used to efficiently determine appropriate hyperparameter values for machine learning base models.

While hyperparameter tuning may be crucial for increasing model performance, it may be associated with overfitting. One technique implemented to mitigate overfitting may be to only tune the hyperparameters in one of the two machine learning base models (for example, the gradient boosting regression). Table 1 shows an example of a user-defined hyperparameter values applied for the gradient boosting model grid search.

TABLE 1

User-defined hyperparameter values entered when running GridSearchCV on the gradient boosting regression base model. All hyperparameters not included in the table were kept at their default value.

| Hyperparameter | Values |
| --- | --- |
| loss | ['ls','lad','huber','quartile'] |
| n_estimators | [100, 250, 500] |
| max_depth | [3, 5, 7, 10] |
| max_features | ['auto','sqrt','log2'] |

A unique approach to mitigate overfitting may be taken, where only the hyperparameters in the gradient boosting regression base model may be tuned; the hyperparameters in the XGBoost Regressor base model may be set to default values. Ten-fold cross validation may be also applied to mitigate overfitting in the machine learning models, which uses subsets (e.g., folds) of the entire training dataset to train, test, and evaluate a model. Each fold possesses a unique test set to evaluate predictions of the model using a training set that excludes the test data.

In machine learning there may be the bias-variance tradeoff. Having a high bias means the model may be too generalized and cannot make accurate predictions; therefore a high bias results in underfitting to the training data. Having a high variance means the model may be too sensitive to small fluctuations in the training data and might not be generalized enough; therefore a high variance results in overfitting. The tradeoff may be that to reduce bias one may increase variance, and vice versa. The optimized gradient boosting regression has lower bias and higher variance, while the non-optimized XGBoost regression has higher bias but lower variance. By having one optimized model and one non-optimized model the likelihood of overfitting may be decreased while might not overly increasing the bias. Another method applied to mitigate overfitting in the machine learning models may be 10-fold cross validation.

10-fold cross validation uses subsets of data, called folds, from the dataset to test and evaluate a model. Each fold possesses a unique test set which ensures that every observation from the dataset may be utilized for testing the model. This method may be also utilized in the grid search process for tuning hyperparameters so that each iteration of possible hyperparameter values may be equally tested on the entirety of the training dataset. Model performance may be evaluated with adjusted R-squared ($R^2_{adj}$), root-mean-square-error (RMSE), and bias.

Table 2 shows the values of each of these performance metrics for the base models and the BOMS 100 system when validated on the Nelson et al. (2013) training dataset.

TABLE 2

Metrics used to measure the performance of the individual base models as well as the Bayesian Optimal Model System (BOMS) when subject to 10-fold cross validation on the training dataset. The performance metrics consist of adjust R-squared ($R_{adj}{}^2$), root mean square error (RMSE) in meters, and bias in meters.

| Model | $R_{adj}{}^2$ | RMSE(m) | Bias(m) |
|---|---|---|---|
| Gradient Boosting Regression | 0.93 | 0.082 | −0.0011 |
| XGBoost Regression | 0.92 | 0.087 | −0.0004 |
| Traykovski et al. (1999) | 0.57 | 0.199 | −0.0603 |
| Nelson et al. (2013) | 0.50 | 0.215 | −0.0879 |
| BOMS | 0.93 | 0.080 | 0.0007 |

$R^2$ may be the percentage of the dependent feature variation that may be explained by the model:

$$R^2 = 1 - \frac{SS_{res}}{SS_{tot}} = 1 - \frac{\sum_{i=1}^{n} (y_i - \hat{y}_i)^2}{\sum_{i=1}^{n} (y_i - \bar{y})^2},$$

where $SS_{res}$ may be the residual sum of squares, $SS_{tot}$ may be the total sum of squares, $y_i$ may be the observed value, $\hat{y}_i$ may be the predicted value, and y may be the overall mean of the observed values. Generally, an $R^2$ value closer to 1 indicates the model explains most of the variability of the dependent feature around its mean.

However, in embodiments, where BOMS 100 may utilize more than one predictor feature, adjusted $R^2$ may be used. Adjusted $R^2$ may be a modified version of $R^2$ that takes the number of predictors into account; if significant predictors may be added the adjusted $R^2$ will increase and if insignificant predictors may be added the adjusted $R^2$ will decrease.

$$R^2_{adj} = 1 - \frac{(1 - R^2)(n - 1)}{(n - k - 1)},$$

where n may be the number of observations, and k may be the number of independent features (e.g., predictors).

RMSE may be the square root of the average of the squared errors—e.g., a measure of the spread of the residuals. Generally, RMSE should be a small value; however, too small of an RMSE value may indicate oversetting.

$$RMSE = \sqrt{\frac{\sum_{i=1}^{n} (\hat{y}_i - y_i)^2}{n}},$$

where $\hat{y}_i$ may be the predicted value, $y_i$ may be the observed value, and n may be the number of observations. It should be noted that for RMSE, a small value may be relative since RMSE can have different units of measurement associated with it. When predicting ripple wavelength the RMSE may be in meters (m).

In conjunction with RMSE, bias may be calculated as the average of the residuals. Bias can be viewed as an accuracy measurement since it may be the difference between the predicted [model] value(s) and the corresponding observed value(s):

$$Bias = \frac{\sum_{i=1}^{n} (\hat{y}_i - y_i)}{n}.$$

The diversity of performance within the BOMS 100 system may be evident when observing Table 2. For the training dataset the machine learning algorithms have high $R^2_{adj}$ scores, RMSE values between about 8.2 and about 8.7 cm, and may be generally unbiased. These values portray the machine learning algorithms as being unbiased but may exhibit some overfitting to the training data. The two deterministic empirical equations, however, may be more biased with lower $R^2_{adj}$ scores and RMSE values between 19 and 21 cm. While these two equations had lower scores and higher error, they may have lower variance when predicting future data compared to the machine learning models that may be subject to slight overfitting. In one example, negatively biased base models may tend to under-predict on the training dataset.

After training, each base model may output its predictions of the test set observations for every cross validation fold. The predictions may be compiled in a new data frame where each column may be dedicated to a base model as well as a final column made up of the true observation values. These columns may serve as input features for the meta-learner.

According to some aspects, assembling a diverse set of one or more algorithms, which compose the base model layer of BOMS 100, allows for better handling of the complex relationships between the predictor variables and ripple geometry and predictive performance. These may include linear, nonlinear, and tree-based algorithms, where some non-limiting examples include:

Linear: least squares linear regression and support vector regression (SVR) with a linear kernel.

Nonlinear: k-neighbors regression and SVR with a radial basis function (RBF) kernel.

Tree-based: random forest regression, adaboost regression, gradient boost regression, and xgboost regression.

Hyperparameters may be configuration variables external to a model (e.g., set by the user) and may be tuned.

Scikit-learn's GridSearchCV function may be run for each base model to efficiently evaluates appropriate hyperparameter values by determining the best combination of user-defined hyperparameter values in which the user can apply to training the base models.

In one example, to mitigate overfitting, 10-fold cross validation may be applied. 10-fold CV uses subsets of data, called folds, from the training dataset to test and evaluate a model. Each fold may have a unique test set which ensures that every observation from the dataset may be utilized for testing the model.

After training, each base model may output its predictions of the test set observations for every cross validation fold. The predictions may be compiled in a new data frame where each column may be dedicated to a base model as well as a final column composed of the true observation values. These columns/values go on to serve as the input features for the meta-learner.

The base model predictions 116 may be provided (e.g., transmitted, exported, etc.) to the meta-learner 118. The predictions 116 from each base model 106 along with its respective observed true values may be exported and used as input features for the meta-learner 118, which may include a Bayesian Regression module 120.

The meta-learner 118 (e.g., via the Bayesian Regression module 120) may generate one or more probabilistic final distributions based on the base model predictions 105. For example, the meta-learner 118 may deduce the base models' biases to best combine their predictions. The meta-learner 118 may use the Bayesian Regression module 120, which may use Bayesian regression) to produce the final probabilistic predictions 122 from the posterior distribution generated using, for example, Markov Chain Monte Carlo sampling.

In some embodiments, the meta-learner 118 for BOMS 100, may include a Bayesian Linear Regression (BLR), which may run via the PyMC3 package for Python (Salvatier et al., 2016). The meta-learner 118 may generate one or more probabilistic predictions from the posterior distribution generated using Markov Chain Monte Carlo sampling.

A BLR may be an approach to the standard linear regression in which Bayesian inference may be used to determine the posterior distribution of the model parameters. Before the posterior distribution can be determined, prior probability may be established for each parameter. Following Bayes' Theorem, the prior probability may be what may be believed before any evidence may be introduced. Since the independent features fed into the meta-learner may be the predictions from all of the base models, the priors may be unknown. If the priors may be unknown, the user may assign a distribution to start with. For BOMS 100, a normal distribution may be assigned as the prior probability for each parameter, in some cases. Other distributions may be used in other cases.

In some embodiments, the BLR may be subjected to the same multi-fold (e.g., 10-fold) cross validation process as applied to the individual base models. According to some aspects, a 10-fold CV applied to the BLR may be technically applied to the entire model system of BOMS 100. The predictions from the 10-fold CV runs of the base models may be fed into the BLR as predictor variables, which serves as the Training Set for the BLR. Thus, the Nelson et al. (2013) training dataset that may be fed into the base models might not be fed directly into the BLR. When validated on the training dataset BOMS 100 resulted with a relatively high score of 0.93, a root-mean-squared-error of around 8, cm and a very slight negative bias.

Determination of the posterior chain relies on Markov Chain Monte Carlo (MCMC) sampling to produce a distribution of possible model parameters (trace plots); this may be the posterior. An example MCMC algorithm used in BOMS 100 may be the No-U-Turn Sampler (NUTS) (Hoffman and Gelman, 2014). To create the trace, NUTS may be set to two chains at 1000 draws and 1000 iterations to tune. A novel, custom function may be defined in Python to evaluate the performance of the BLR by comparing the predictions with the true observations. The function draws 1000 random samples from a Gaussian distribution whose center and scale may be the mean and standard deviation of the predicted value, respectively. The mean and standard deviation of the predicted value may be extracted from the posterior. The random sample values may be used to create histograms with set number of bins, which may be subsequently used to produce the posterior probability plots where the posterior distribution indicates the model prediction uncertainty.

In one example, 1000 random samples may be drawn from a Gaussian distribution where the center of the distribution may be the mean predicted value and the scale of the distribution may be the standard deviation. A lesser number of random samples may result in an unrepresentative density curve. The random sample values may be then used as input data to create the histogram. It may be generally good practice to use between five and twenty bins, but the number could vary, depending on application, distribution, shape, and the like. Too few bins results in a histogram that may lack the detail to get useful information from the plot. Too many bins results in a histogram where the useful information may be hard to distinguish from the noise. There exists a variety of formulas developed for calculating the optimal number of bins for a histogram.

Two such formulas may be used in tandem to determine the number of bins used in the BOMS 100 density plots: Sturges' rule and the Rice rule.

Sturges' rule may be utilized in many statistical packages and may be widely used for constructing histograms:

$$k_{Sturges} = 1 + \log_2 n,$$

which shows Sturges' rule, where k may be the number of bins and n may be the number of observations. Caution should be taken when using Sturges' rule as it has faced criticism for over-smoothing Hyndman (1995).

The Rice rule may be used to help make a final decision on bin number. The Rice rule tends to be better at calculating an acceptable bin number than Sturges' rule when dealing with a relatively large number of observations (e.g., >200):

$$k_{Rice} = 2\sqrt[3]{n},$$

which shows the Rice rule, where k may be the number of bins and n may be the number of observations. The median between $k_{sturges}$ and $k_{Rice}$, which equaled 15 in this one example, may be used as the overall number of bins to avoid both over-smoothing and noise. In addition to creating density plots, the mean predicted value for each observation can also be used in a scatter plot to visually evaluate predictions vs. observations.

In some cases, the BLR may be subjected to the same ten-fold cross validation process as applied to the individual base models. The predictions from the base models, along with its respected observation values, serve as the training set for the BLR. The ten-fold cross validation of the BLR therefore represents the performance of the overall stacked system. The results show that the stacked system, BOMS 100, performed better than any of the base models individually with a $R^2$ value of 0.93, a RMSE of about 8 cm, and a near-zero negative bias.

Figure 3:
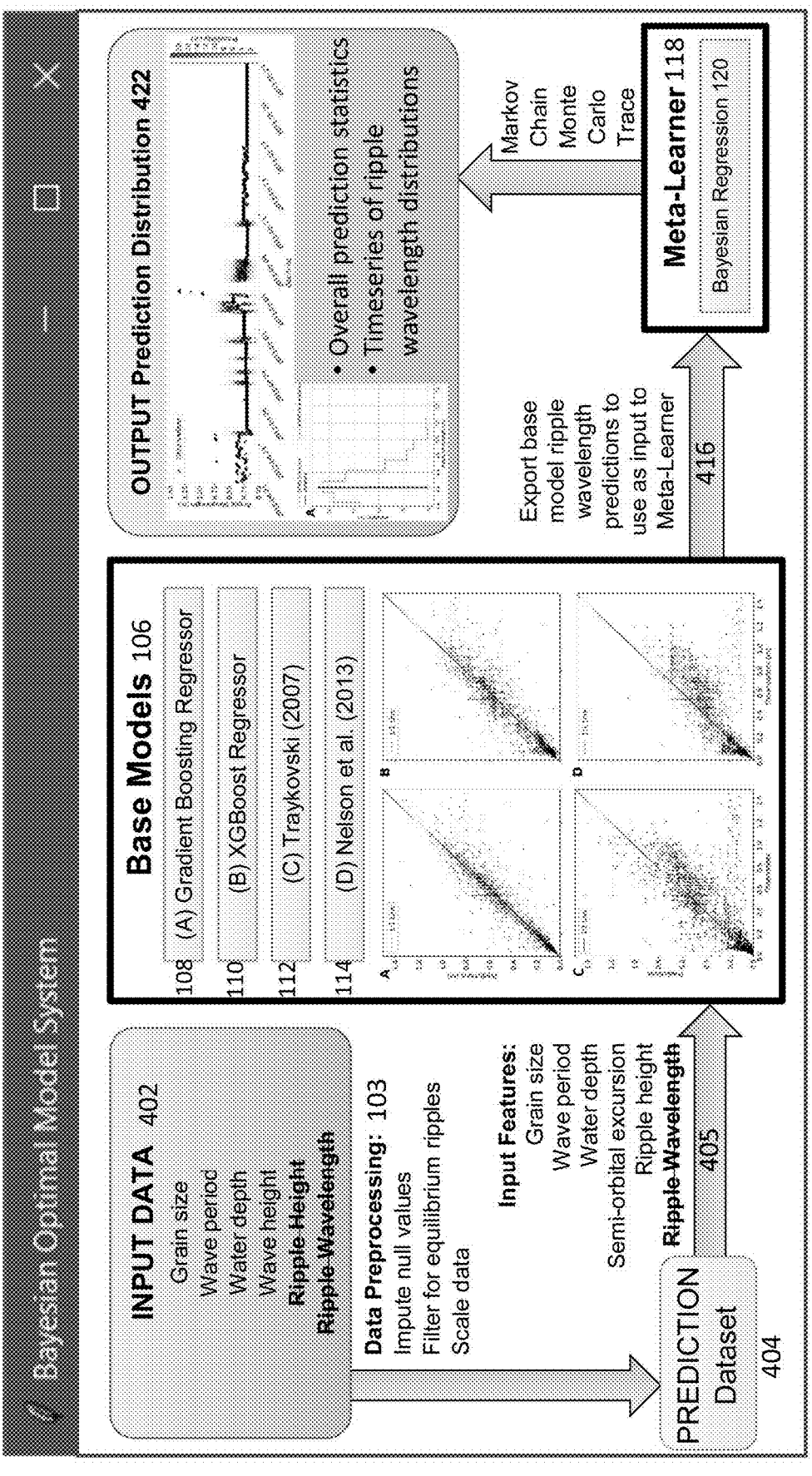
FIG. 3 illustrates a schematic flow diagram for predicting ripple geometry with BOMS, in accordance with disclosed aspects.

FIG. 3 illustrates a schematic flow diagram for predicting ripple wavelengths (e.g., generating output prediction distributions) with BOMS 400. System 400 may be similar to system 100; however, according to some aspects, system 400 may include a different input from system 100. System 400 may be trained with the 50+ year dataset compiled by Nelson et al. (2013) as described herein as system 100. System 400 might not include ripple information in the input data 402 (e.g., system 400 may generate and/or predict this ripple information). For example, the input data 402 may include Grain size, Wave period, Water depth, Wave height, and/or the like. The input data 402 may be preprocessed 103 to form a prediction data set 404. In the preprocessing step 103, the system 400 may determine when the ripples may be in equilibrium with the waves. According to some aspects, either a Shields parameter or a Ripple reset number may be used to determine if ripples are in equilibrium as described herein in system 100. The generated input features 405 may include Grain size, Wave period, Water depth, Semi-orbital excursion, Ripple height, and/or the like. These input features 405 may be ran through one or more base models 106, which may generate base model ripple wavelength predictions 416. The predictions 416 from each base model 106 may be exported and used as input features for the meta-learner 118, which may include a Bayesian Regression module 120. The meta-learner 118 may generate one or more output prediction distributions 422. The output prediction distributions 422 may include overall prediction statistics, time series of ripple wavelength distributions, or the like. In an example, the top graph shows a probability distribution of the ripple wavelengths and the observations, and the lower graph shows the predicted distribution with the most probable predicted ripple wavelength (dashed) and the observed wavelength at one time in the time series. These graphs are discussed in greater detail herein.

FIGS. 4A-4G illustrate an example schematic of a graphical user interface window in accordance with disclosed aspects. A graphical user interface (GUI) 500 may allow the user to provide inputs and outputs of BOMS. According to some aspects, a user has the option to either use a pre-trained version of BOMS to make predictions given wave conditions or provide new data to retrain BOMS. BOMS has the option to impute missing values in the user's dataset as well as options to define plot font size, number of folds for cross validation, and number of random samples for probability distributions. The user may also choose which plots may be output: scatter plot of predictions vs observations; timeseries plot of predictions vs observations; and/or a probability plot for each data point in the user's input dataset.

FIG. 4A illustrates an exemplary GUI 500 with one or more options for selecting or configuring the BOMS 100 and 400. According to some aspects, BOMS can uniquely combine two machine learning algorithms and two deterministic empirical equations along with a Bayesian regression algorithm to produce probabilistic predictions of equilibrium ripple wavelength. In a novel manner, BOMS 400 estimates uncertainties and provides probabilistic output versus the previous state-of-the-art deterministic (e.g., one value) predictions. The probabilistic output provides the model prediction uncertainty. To increase the accessibility of the model system the graphical user interface (GUI) 500 of BOMS provides the capabilities of performing data preprocessing as well as allowing a user to run a pre-trained version (e.g., BOMS 400) or re-optimize (e.g., BOMS 100) with additional data. Through the GUI 500, a user can output a scatter plot and/or timeseries of predictions vs. observations, a probability plot for each data point in the dataset, a dataset of the prediction probabilities, a dataset of a user-defined number of BOMS realizations for each data point, or any combination of those options. The usability of the model may be a major benefit in its application for naval and/or community use.

FIG. 4B shows an option for a user to run a pre-trained version of BOMS 400. In some embodiments, no additional training data may be performed, and a pre-trained version of BOMS 400 may be used. The pre-trained version may use previously-stored training data. A user may select the "Use Pre-Trained BOMS" (1). According to some aspects, using a pre-trained version of BOMS 400 may product predictions based on the original training dataset.

FIG. 4C shows an option for a user to select a training data set. In some embodiments, the user may provide additional data to the BOMS 100 to train and/or retrain the BOMS 100, such as via an option of "Choose a Training Dataset" (2). The additional data may be used alone or in combination with pre-trained data. Use of additional data may produce new predictions based on a new training dataset.

FIG. 4D shows an option for a user to select a prediction data set, such as via "Choose a Prediction Dataset" (3) option. In some embodiments, a user may select wave condition data (Prediction dataset). For example, a user may select a dataset from which to predict ripple wavelength. There may be a selectable option to impute any missing data or values.

FIG. 4E shows input fields for the number of folds for cross validation and the number of random samples (4). As shown in this example, the number of folds may be 10 and the number of random samples may be 1000.

FIG. 4F shows selection output options for the algorithm generated plots for the prediction plotting (5). The example in FIG. 4F shows three options (Scatter, Timeseries, and Probability), but different ones may be available. Other options may be available, such as the font size for the plots, etc.

FIG. 4G illustrates an option to run the BOMS 100 and/or 400 (6). According to some aspects, selection of this option may run the algorithm(s), generate/output plots, and/or generate/output data files. In some embodiments, running the BOMS 400 may produce a distribution of ripple wavelengths for each time in the designated prediction dataset (e.g., designated in step 3).

Figure 4H:
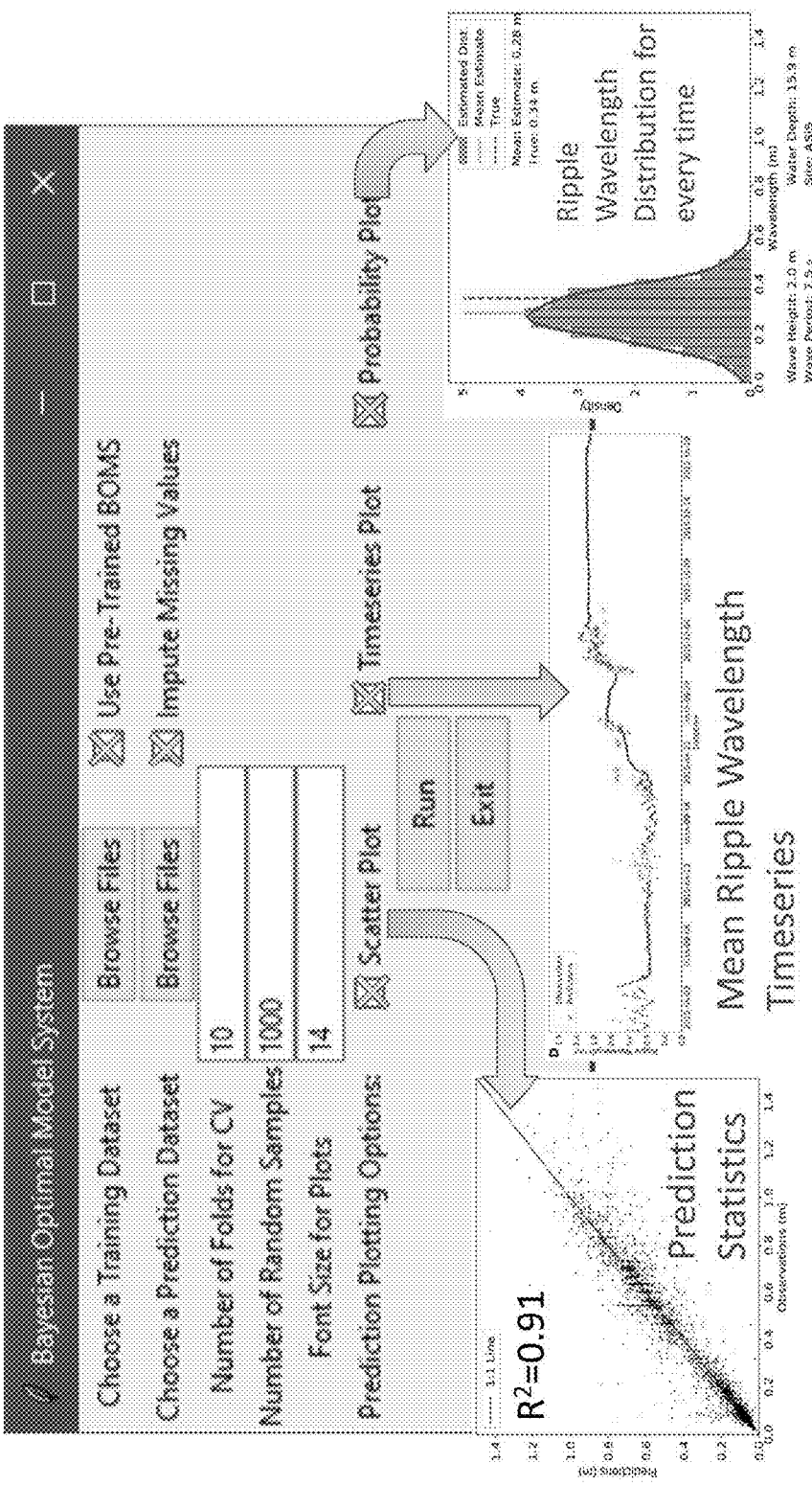

FIG. 4H illustrates the output that may be generated from system 100 and/or 400. Plots may include a scatter plot with the prediction statistics (R-squared, RMSE, bias, etc.), a timeseries plot of the most probable or mean ripple wavelength, the probability distribution of the ripple wavelengths predicted for every input instance, and/or the like.

Examples of Reductions to Practice

Figure 5:
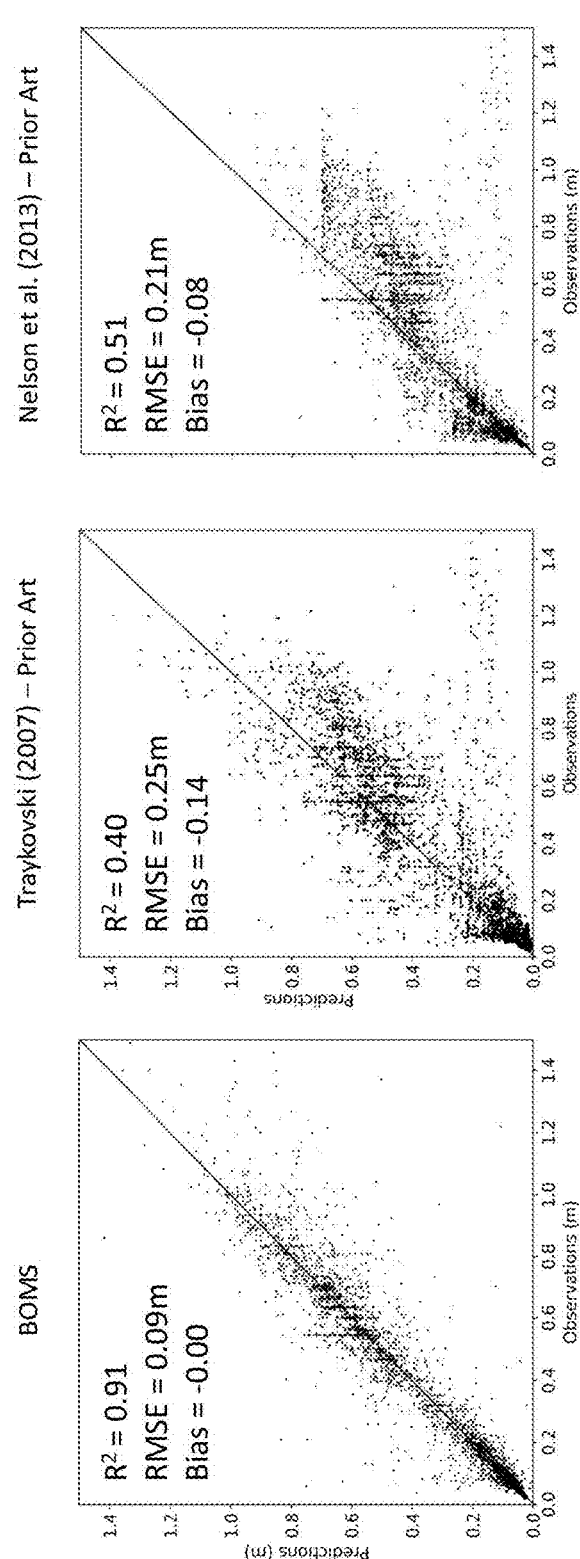
FIG. 5 illustrates an example reduction to practice of BOMS, in accordance with disclosed aspects.

FIG. 5 illustrates an example reduction to practice of BOMS in accordance with disclosed aspects. Scatter plots of the observed and predicted ripple wavelengths for BOMS (10-fold cross validation of training data) and two of the deterministic ripple equations (Traykovski (2007)—Prior Art and Nelson et al. (2013)—Prior Art).

BOMS output provided from a 10-fold cross validation of the training data. Model performance may be evaluated with adjusted R-squared ($R^2_{adj}$), root-mean-square-error (RMSE), and bias. The two deterministic empirical equations may be more biased, have lower $R^2_{adj}$ scores, and higher RMSE values at 25 and 21 cm. After training, each base model output its predictions of the test set observations for every cross validation fold. The predictions may be compiled in a new data frame that included the output from each of the base models as well as the observation values. The new dataset may be used as the input data to the meta-learner. The Meta-Learner deduced the biases of the base models and resulted in the final BOMS prediction shown here. As shown, BOMS adjusted $R^2$ may be significantly higher with no bias. As shown, the RMSE of BOMS may be reduced by more than 12 cm compared to Traykovski (2007) and Nelson et al. (2013).

The two existing machine learning models that be used to predict ripple geometry, Goldstein et al. (2013) and Yan et al. (2008), might not be directly compared to BOMS due to, for example, the different outputs. The GP predictor of Goldstein et al. (2013) reportedly had an NRMSE of 0.74; however, the data does not undergo the same preprocessing techniques as those found in BOMS. Also, Goldstein et al. (2013) assumed all field measurements of ripples may be at or near equilibrium which has the potential to produce higher errors in the model output, resulting in a higher NRMSE. Yan et al. (2008) did not report on the NRMSE of their ANN.

BOMS may be used in a research environment to predict equilibrium ripple wavelengths as input to seafloor boundary layer models. These time-dependent models may be driven towards the equilibrium ripple wavelength associated with the instantaneous wave conditions and adjusted with a timescale parameter that may be dependent on ripple size and the magnitude of bottom velocity.

The implementation of BOMS into these models may be crucial for accurate predictions of the seafloor boundary layer due to the sensitivity of the model to an accurate prediction of equilibrium ripple wavelength.

Figure 8:
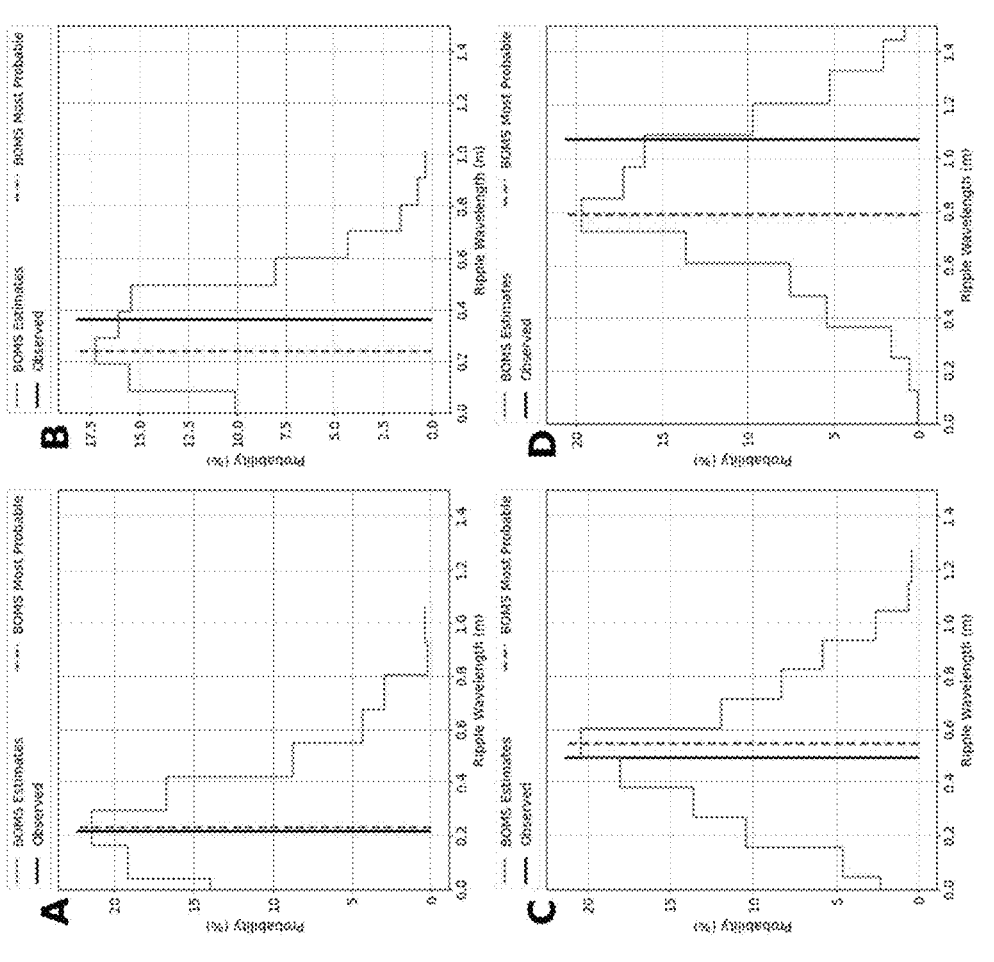
FIG. 8 illustrates an example reduction to practice of BOMS, in accordance with disclosed aspects.

FIGS. 6-8 illustrate a second reduction to practice. BOMS may be tested and validated on data from three field sites that might not be included in the training dataset: TREX13 (Gulf of Mexico); WQS14 (Virginia coast); and ASIS15 (Assateague Island). Three separate field experiments in the Gulf of Mexico in 2013 and off the Virginia coast in 2014 and 2015 provided observations of wave heights, wave periods, bottom velocities, sediment grain size, and ripple wavelength. These datasets may be preprocessed 103 and BOMS 400 trained with the Nelson et al. (2013) dataset may be used to predict the equilibrium ripple wavelengths observed during the three field experiments.

According to some aspects, the TREX13, WQS14, and ASIS15 data presented here in the example reductions to practice were not included in the training dataset for BOMS described above, and may be different from 10-fold cross validation, such as described above. The reduction to practice establishes testing BOMS on data that is not part of the training dataset, and therefore was not part of the 10-fold cross validation. Testing on completely separate data was performed by the inventors to further assess the performance of BOMS.

The Target and Reverberation Experiment (TREX13) off the coast of Panama City, FL in Spring of 2015 included moored instruments to collect in-situ observations of hydrodynamics and the seabed (NRL deployed moored instruments to collect in-situ observations in ~8 m water depth, Penko et al., 2017). The Target and Reverberation Experiment (TREX13), a joint ONR/NRIJSERDP field experiment off the coast of Panama City, FL in Spring of 2015, funded the deployment of moored and platform observations of hydrodynamics and sediment dynamics. Two instrumented quadpods in approximately 7.5 m and 20 m depths collected data for 34 days (20 Apr.-23 May 2013). A Nortek AWAC-AST® recorded wave height, period, and direction at 2 Hz for 1,024 seconds every 30 minutes. Over the month-long deployment, the conditions ranged from calm (significant wave heights of 0.24 m and peak periods of 5 s) to fairly energetic (significant wave heights of 2 m and peak periods of 8 s). Bedforms may be observed with high-frequency (2.25 MHz) sector-scanning sonar in about a 15 m2 may be of the seabed every 12 minutes (Penko et al., 2017). The sediment at the site may be observed to have a median grain size of 0.23 mm.

The U.S. Geological Survey and University of Delaware deployed a bottom moored instrument frame in Summer and Fall of 2014 at Winter Quarter Shoals (WQS14), located 11 km off the coast of Assateague Island, VA (The U.S. Geological Survey and University of Delaware deployed a bottom moored instrument frame in ~9 m water depth, Pendleton et al. (2016)). The depth at WQS ranges from 12 m to 4 m. Both deployments occurred on the shallow NE slope of the shoal. The sediment at the site may be observed to have a median grain size of 0.66 mm. The frame may be equipped with an upward looking Teledyne RD Instruments Workhorse Sentinel 600 kHz Acoustic Doppler Current Profiler (ADCP) to collect water column currents and waves, as well as an Imagenex 881 Tilt-head Fanbeam Rotary sonar for time-lapse acoustic imagery of the seabed. Both instruments sampled every 60 min. The first deployment occurred from June 19-Aug. 21, 2014; nearly constant ripple formation and reworking may be observed over the course of the deployment. The second deployment occurred from Sep. 2-Oct. 10, 2014; ripple formation occurred less frequently with longer periods of quiescent conditions promoting relict ripple formation and erosion.

An additional experiment performed by the U.S. Geological Survey and University of Delaware off the coast of Assateague Island in 2015 (ASIS15) provided a rich dataset of bedform evolution (U.S. Geological Survey and University of Delaware deployed a bottom moored instrument frame in ~16 m water depth, Trembanis et al. (2019) and DuVal et al. (2021)). An experiment performed by the University of Delaware off the coast of Assateague Island in 2015 provided a rich dataset of bedform evolution (DuVal et al. 2020). The team deployed an upward looking Teledyne RD Instruments Workhorse Sentinel 600 kHz Acoustic Doppler Current Profiler (ADCP) to measure currents and waves, and an Imagenex 881 Tilt-head Fanbeam Rotary sonar to capture acoustic imagery of the seabed every hour. The sediment samples taken at the site indicated poorly sorted gravelly sand with a median grain size of 1.03 mm. Hurricane Joaquin passed over the experiment site in early October, generating near-bed velocities over 1 m/s.

FIG. 6 illustrates the mean wavelength predicted with BOMS 400 (x's) and the observed wavelength (black dots) from each of the field experiments in time. An example reduction to practice may be to provide a timeseries of ocean wave conditions at a specific location and over a specific time period and BOMS 400 may predict a mean ripple wavelength for each time. The RMSE and bias may be fairly consistent between the different site locations and range from about 5 to 10 cm and about −3 and 5 cm, respectively. Table 3 shows the RMSE and bias vales for each of the prediction datasets 404 when predicting equilibrium ripple geometry with BOMS 400 trained with the Nelson et al. (2013) dataset.

TABLE 3

Table of metrics quantifying the performance of the Bayesian Optimal Model System (BOMS) tested with the TREX13, WQS14, and ASIS15 datasets. Performance metrics consist of root mean square error (RMSE) in meters and bias in meters.

| Field Site | RMSE(m) | Bias(m) |
|---|---|---|
| TREX13 7.5 m | 0.093 | 0.0171 |
| TREX13 20 m | 0.051 | 0.0512 |
| WQS14 | 0.087 | 0.0510 |
| ASIS15 | 0.107 | −0.0387 |

FIG. 7 illustrates another reduction to practice similar to FIG. 6 but with the probability distribution of ripple wavelengths predicted with BOMS 400 as well.

Example probability distributions compared to the observed ripple wavelengths for each time in the prediction dataset may be shown in FIG. 8.

FIG. 8 illustrates sample probability plots at a specific time for A) TREX13 7.5 m; B) TREX13 20 m; C) WQS14; and D) ASIS15 where the probability distributions (stepped lines) may be outputs from BOMS, and the observed wavelengths (solid vertical lines) may be compared to the most probable wavelengths from the predicted distributions (dashed vertical lines). As shown, the BOMS probability distributions (stepped lines) and most probable (dashed vertical lines) may be compared to the observed ripple wavelengths (solid vertical) at random times from each field experiment. The wider probability distributions indicate higher model uncertainty, the closer the dashed line may be to the solid vertical line indicates an accurate prediction, and the observed wavelength tends to fall within the predicted distributions.

The present state-of-the-art deterministic equations of equilibrium ripple height do not provide the necessary information critical for the coupling of the temporally and spatially varying seafloor roughness into hydrodynamic and acoustic models. BOMS on the other hand may be a novel compilation and/or application of environmental and machine learning algorithms that provides probabilistic predictions of seafloor ripple wavelengths given surface wave conditions. The distribution of ripple wavelengths provided by BOMS gives the necessary input for stochastic bottom boundary layer models predicting time series of seafloor spectra at given locations. Without the probabilistic output of BOMS, ensembles of seafloor roughness might not be feasible. Additionally, knowing the uncertainty of the prediction provides a critical piece of information to models for seafloor roughness—how confident we may be of the result. Given its utility, BOMS may be used to provide probability distributions of seafloor ripple geometry given observed or forecasted hydrodynamic conditions to acoustic models, to estimate the changing seafloor roughness for dynamic coupling of the ocean-seafloor interaction within hydrodynamic models, and as an indicator of seafloor properties given acoustic observations.

One or more aspects described herein provide for specific naval and/or military applications. For example, seafloor ripples affect bottom boundary layer hydrodynamics, sediment transport, and sediment resuspension. Seafloor ripples also affect bottom roughness and may be therefore important for naval (or water-based/aquatic) applications and/or operations, such as acoustic sonar performance and/or use, and the detection of buried objects. Additionally, the prediction of seafloor roughness and sediment resuspension due to waves and currents may be critical to coastal hydrodynamic and morphological forecasting. One or more aspects may be useful in the oil/gas industry due to the effect of sand ripples on obscured/buried pipelines. According to some aspects, aspects herein may be used to develop a mission route plan associated with operating a vessel based on a generated probabilistic distribution of predicted seafloor ripple geometry.

FIG. 9 illustrates an example method 900, in accordance with one or more disclosed aspects. For example, method 900 may be a method of training a machine learning model to predict seafloor ripple geometry, such as system 100 and/or system 400. Step 902 may include receiving, by a processing device, one or more input values, each input value based on an observation associated with sea water conditions. Step 904 may include generating, by the processing device, a preprocessed data set by performing at least one preprocessing step on the one or more input values, wherein the at least one preprocessing step comprises imputing one or more null values into the input values, filtering the input values for equilibrium ripples, or scaling one or more of the input values. Step 906 may include generating, by the processing device, a training data set based on the preprocessed data set. Step 908 may include splitting, by the processing device, the training data set into a plurality of folds, each of the folds comprises a distinct test set for evaluating predictions. Step 910 may include training, by the processing device, via stacked generalization, the machine learning model by performing a cross validation of each fold of training data based on at least one deterministic equilibrium ripple predictor model and on at least one machine learning algorithm. Step 912 may include generating, by the processing device, via the trained machine learning model, a set of one or more seafloor ripple geometry predictions. Step 914 may include performing, by the processing device, Bayesian regression on the set of one or more seafloor ripple geometry predictions, wherein the Bayesian regression is based on posterior distribution generated using Markov Chain Monte Carlo sampling. Step 916 may include responsive to performing the Bayesian regression, generating, by the processing device, a probabilistic distribution of predicted seafloor ripple geometry. Step 918 may include performing one or more aquatic operations based on the generated probabilistic distribution of predicted seafloor ripple geometry. In some embodiments, step 918 may be performed by a processing device, in accordance with disclosed aspects. One or more steps may be repeated, added, modified, and/or excluded.

Figure 10:
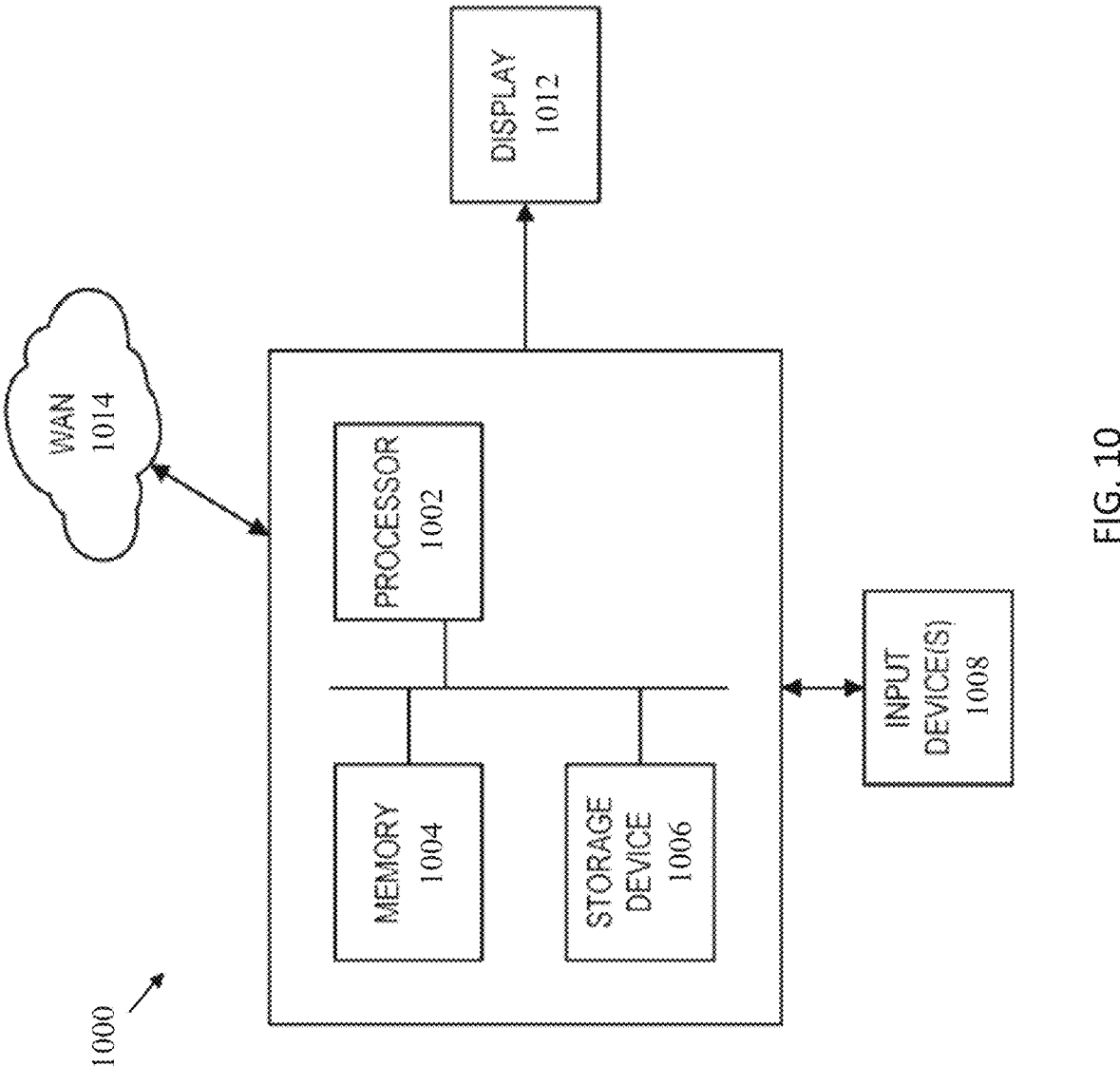
FIG. 10 illustrates a diagram of an example computer system, in accordance disclosed aspects.

One or more aspects described herein may be implemented on virtually any type of computer regardless of the platform being used. For example, as shown in FIG. 10, a computer system 1000 includes a processor 1002, associated memory 1004, a storage device 1006, and numerous other elements and functionalities typical of today's computers (not shown). The computer 1000 may also include input means 1008, such as a keyboard and a mouse, and output means 1012, such as a monitor or LED. The computer system 1000 may be connected to a local may be a network (LAN) or a wide may be a network (e.g., the Internet) 1014 via a network interface connection (not shown). Those skilled in the art will appreciate that these input and output means may take other forms.

Further, those skilled in the art will appreciate that one or more elements of the aforementioned computer system 1000 may be located at a remote location and connected to the other elements over a network. Further, the disclosure may be implemented on a distributed system having a plurality of nodes, where each portion of the disclosure (e.g., real-time instrumentation component, response vehicle(s), data sources, etc.) may be located on a different node within the distributed system. In one embodiment of the disclosure, the node corresponds to a computer system. Alternatively, the node may correspond to a processor with associated physical memory. The node may alternatively correspond to a processor with shared memory and/or resources. Further, software instructions to perform embodiments of the disclosure may be stored on a computer-readable medium (i.e., a non-transitory computer-readable medium) such as a compact disc (CD), a diskette, a tape, a file, or any other computer readable storage device. The present disclosure provides for a non-transitory computer readable medium comprising computer code, the computer code, when executed by a processor, causes the processor to perform aspects disclosed herein.

Embodiments for predicting seafloor ripple geometry been described. According to some aspects, one or more features described herein may be described with respect to system 100, however such descriptions may apply for system 400. Although particular embodiments, aspects, and features have been described and illustrated, one skilled in the art may readily appreciate that the aspects described herein are not limited to only those embodiments, aspects, and features but also contemplates any and all modifications and alternative embodiments that are within the spirit and scope of the underlying aspects described and claimed herein. The present application contemplates any and all modifications within the spirit and scope of the underlying aspects described and claimed herein, and all such modifications and alternative embodiments are deemed to be within the scope and spirit of the present disclosure.

What may be claimed is:

1. A method of training a machine learning model to predict seafloor ripple geometry, the method comprising:

receiving, by a processing device, one or more input values, each input value being based on an observation associated with ocean wave and seafloor conditions;

generating, by the processing device, a preprocessed data set by performing at least one preprocessing step on the one or more input values, wherein the at least one preprocessing step comprises imputing one or more null values into the one or more input values, filtering the one or more input values for equilibrium ripples, or scaling one or more of the one or more input values;

generating, by the processing device, a training data set based on the preprocessed data set;

splitting, by the processing device, the training data set into a plurality of folds, wherein each of the folds comprises a distinct test set for evaluating predictions;

training, by the processing device, via stacked generalization, the machine learning model by performing a cross validation of each of the folds of training data based on at least one deterministic equilibrium ripple predictor model and on at least one machine learning algorithm;

generating, by the processing device, via the trained machine learning model, a set of one or more seafloor ripple geometry predictions;

performing, by the processing device, Bayesian regression on the set of one or more seafloor ripple geometry predictions, wherein the Bayesian regression is based on a posterior distribution generated using Markov Chain Monte Carlo sampling;

responsive to performing the Bayesian regression, generating, by the processing device, a probabilistic distribution of predicted seafloor ripple geometry; and performing one or more underwater operations based on the generated probabilistic distribution of predicted seafloor ripple geometry.

2. The method of claim 1, wherein the one or more input values is based on the preprocessed data set collected over a period of time.

3. The method of claim 2, wherein the one or more input values further comprises a set of additional training data separate from the preprocessed data set.

4. The method of claim 1, wherein the trained machine learning model comprises one or more hyperparameters.

5. The method of claim 1, wherein the trained machine learning model comprises at least one hyperparameter, wherein the method further comprises optimizing the at least one hyperparameter for an optimal value via a grid search operation, wherein the optimal value minimizes model overfitting.

6. The method of claim 5, wherein the optimizing comprises optimizing one or more hyperparameters for a gradient boosting regression base model, and wherein one or more of the at least one hyperparameter comprises a hyperparameter for an XGBoost Regressor base model is set to a default value.

7. The method of claim 1, wherein the at least one machine learning algorithm comprises an XGBoost Regressor base model or a gradient boosting regression base model.

8. The method of claim 7, further comprising optimizing one or more hyperparameters for the gradient boosting regression base model.

9. The method of claim 1, further comprising determining an amount of the plurality of the folds based on bias-variance tradeoff, wherein bias is associated with model generalization, and variance is associated with model overfitting or model underfitting.

10. The method of claim 1, wherein training the machine learning model comprises evaluating model performance based on at least one of adjusted R-squared ($R^2_{adj}$), root-mean-square-error (RMSE), or bias, wherein $R^2$ is a percentage of a dependent feature variation of the machine learning model, adjusted R-squared ($R^2_{adj}$) is a modified version of $R^2$ that takes one or more predictors into account, RMSE is a square root of an average of squared errors, and bias is associated with a difference between a predicted model value and a corresponding observed value.

11. The method of claim 1, wherein the one or more input values comprise ripple height or ripple wavelength.

12. The method of claim 1, the one or more input values exclude ripple height or ripple wavelength.

13. The method of claim 1, wherein the generated set of one or more seafloor ripple geometry predictions comprises a generated set of a plurality of seafloor ripple geometry predictions, wherein performing the Bayesian regression further comprises:

determining biases associated with the at least one deterministic equilibrium ripple predictor model and the at least one machine learning algorithm, and combining the generated set of the plurality of seafloor ripple geometry predictions based on the determined biases.

14. The method of claim 1, wherein performing the Bayesian regression further comprises performing the Bayesian regression on observed true values associated with the at least one deterministic equilibrium ripple predictor model and the at least one machine learning algorithm.

15. The method of claim 1, wherein performing one or more underwater operations further comprises developing a mission route plan associated with operating a vessel based on the generated probabilistic distribution of predicted seafloor ripple geometry.

16. The method of claim 1, wherein performing one or more underwater operations further comprises calculating a performance of an acoustical device based on the generated probabilistic distribution of predicted seafloor ripple geometry.

17. The method of claim 1, wherein performing one or more underwater operations further comprises detecting an obscured object based on the generated probabilistic distribution of predicted seafloor ripple geometry.

18. The method of claim 1, wherein performing one or more underwater operations further comprises inputting one or more seafloor roughness values into a coastal hydrodynamic model or a morphological model based on the generated probabilistic distribution of predicted seafloor ripple geometry.

19. The method of claim 1, wherein the probabilistic distribution of predicted seafloor ripple geometry comprises one or more seafloor ripple wavelengths at a specified location.

* * * * *